(12) United States Patent
Zhang et al.

(10) Patent No.: US 11,272,391 B2
(45) Date of Patent: Mar. 8, 2022

(54) CONCATENATION OF SERVICE DATA UNITS ABOVE A PACKET DATA CONVERGENCE PROTOCOL LAYER

(71) Applicant: APPLE INC., Cupertino, CA (US)

(72) Inventors: Yujian Zhang, Beijing (CN); Sudeep Palat, Gloucestershire (GB); Jing Zhu, Portland, OR (US); Wey-Yi Guy, Beaverton, OR (US); Youn Hyoung Heo, Seoul (KR)

(73) Assignee: APPLE INC., Cupertino, CA (US)

( * ) Notice: Subject to any disclaimer, the term of this patent is extended or adjusted under 35 U.S.C. 154(b) by 243 days.

(21) Appl. No.: 16/475,817

(22) PCT Filed: Jan. 18, 2018

(86) PCT No.: PCT/US2018/014270
§ 371 (c)(1),
(2) Date: Jul. 3, 2019

(87) PCT Pub. No.: WO2018/144233
PCT Pub. Date: Aug. 9, 2018

(65) Prior Publication Data
US 2021/0058818 A1     Feb. 25, 2021

Related U.S. Application Data

(60) Provisional application No. 62/454,471, filed on Feb. 3, 2017, provisional application No. 62/575,214, filed on Oct. 20, 2017.

(51) Int. Cl.
*H04W 28/06*     (2009.01)
*H04W 28/02*     (2009.01)
(Continued)

(52) U.S. Cl.
CPC ....... *H04W 28/0268* (2013.01); *H04L 1/0083* (2013.01); *H04L 5/023* (2013.01);
(Continued)

(58) Field of Classification Search
CPC ...... H04L 69/321; H04L 5/023; H04J 13/107; H04W 80/06
See application file for complete search history.

(56) References Cited

U.S. PATENT DOCUMENTS

| | | |
|---|---|---|
| 2011/0038313 A1 | 2/2011 | Park et al. |
| 2016/0135084 A1 | 5/2016 | Yi et al. |

(Continued)

FOREIGN PATENT DOCUMENTS

EP     1868311 A1     12/2007

OTHER PUBLICATIONS

R2-1700226, "Concatenation at PDCP", Jan. 17-19, 2017 (Year: 2017).*

(Continued)

*Primary Examiner* — Salvador E Rivas
(74) *Attorney, Agent, or Firm* — Stoel Rives LLP

(57) ABSTRACT

An apparatus of a cellular data communication device includes one or more memory devices configured to store data corresponding to a plurality of service data units (SDUs) from a protocol layer higher than a packet data convergence protocol (PDCP) layer of a cellular data network, and one or more processors operably coupled to the one or more memory devices and configured to concatenate the plurality of SDUs into a single protocol data unit (PDU) above the PDCP layer.

17 Claims, 15 Drawing Sheets

(51) Int. Cl.

| | | |
|---|---|---|
| *H04W 76/27* | (2018.01) | |
| *H04L 1/00* | (2006.01) | |
| *H04W 80/02* | (2009.01) | |
| *H04L 5/02* | (2006.01) | |
| *H04J 13/10* | (2011.01) | |
| *H04W 80/06* | (2009.01) | |

(52) U.S. Cl.
CPC ......... *H04W 28/065* (2013.01); *H04W 76/27* (2018.02); *H04W 80/02* (2013.01); *H04J 13/107* (2013.01); *H04W 80/06* (2013.01)

(56) References Cited

U.S. PATENT DOCUMENTS

| | | | |
|---|---|---|---|
| 2017/0064592 A1* | 3/2017 | Cai | H04W 36/02 |
| 2017/0135151 A1* | 5/2017 | Fujishiro | H04W 24/10 |
| 2019/0349804 A1* | 11/2019 | Cho | H04W 28/0263 |
| 2020/0112598 A1* | 4/2020 | Petry | H04N 21/235 |
| 2020/0305225 A1* | 9/2020 | Zhang | H04L 67/10 |

OTHER PUBLICATIONS

CATT, "Reconfiguration for the mapping of QoS flow and RB", R2-1700200, 3GPP TSG RAN WG2 Meeting Ad Hoc, Spokane, Washington, USA, Agenda Item 3.2.1.3, Jan. 17-19, 2017, 2 pages.

Huawei, Hisilicon, "A New Protocol Layer for Qos Flow to DRB Mapping", R2-1700088, 3GPP TSG-RAN2 Meeting Ad hoc, Spokane, Washington, USA, Agenda Item 3.2.1.3, Jan. 17-19, 2017, 5 pages.

LG Electronics Inc., "Qos flow to DRB mapping", R2-1700284, 3GPP TSG-RAN WG2 NR Ad Hoc, Spokane, Washington, USA, Agenda Item 3.2.1.3, Jan. 17-19, 2017, 3 pages.

Mediatek Inc., "Concatenation at PDCP", Tdoc R2-1700226, 3GPP TSG-RAN WG2 NR, Spokane, Washington, USA, Agenda Item 3.2.1.1, Jan. 17-19, 2017, 3 pages.

PCT/US2018/014270, International Search Report and Written Opinion, dated Jul. 6, 2018, 24 pages.

* cited by examiner

CONCATENATION OF SERVICE DATA UNITS ABOVE A PACKET DATA CONVERGENCE PROTOCOL LAYER

RELATED APPLICATIONS

This application is a non-provisional of U.S. Provisional Patent Application No. 62/454,471, filed Feb. 3, 2017 and U.S. Provisional Patent Application No. 62/575,214, filed Oct. 20, 2017, the entire disclosures of both of which are hereby incorporated herein by reference.

BACKGROUND

Various embodiments generally may relate to the field of wireless communications.

DETAILED DESCRIPTION

Figure 1:
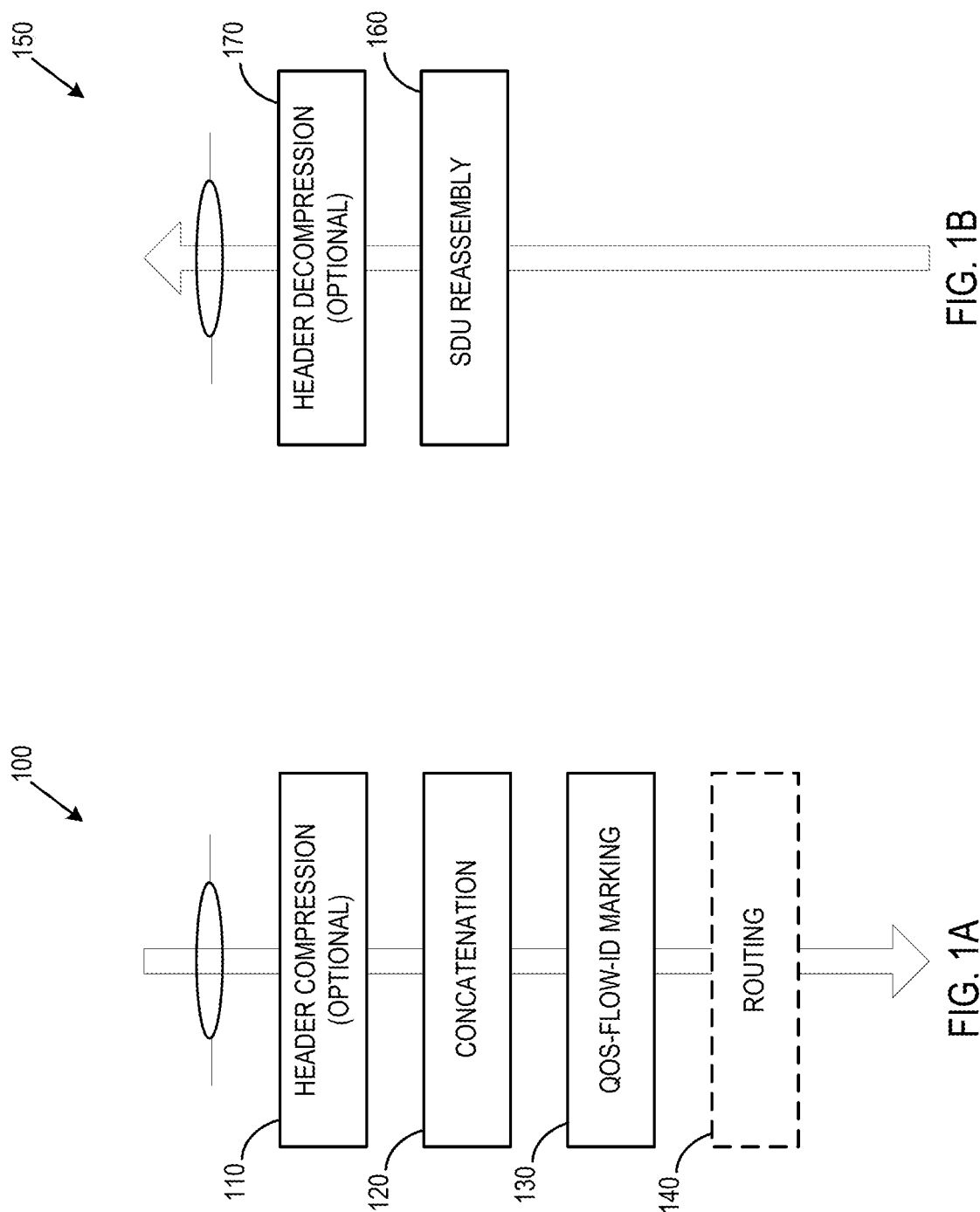
FIG. 1A is a simplified flowchart illustrating a method of transmitting data, according to some embodiments.
FIG. 1B is a simplified flowchart illustrating a method of receiving data, according to some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The fifth generation of mobile technology (5G) is positioned to address the demands and business contexts of 2020 and beyond, that is, to enable a fully mobile and connected society and to empower socio-economic transformations in countless ways, many of which are unimagined today, including those for productivity, sustainability and well-being. In descriptions of embodiments herein, 5G and New Radio (NR) may be used interchangeably.

In a RAN2 NR AH #I meeting held in January 2017, it was agreed that a new user plane access stratum (AS) protocol layer (e.g., a packet data association protocol (PDAP) layer) above the packet data convergence protocol (PDCP) layer should be introduced to accommodate the functions introduced in AS for the new QoS framework, including:
quality of service (QoS) flow→data radio bearer (DRB) routing;
QoS flow identification (QoS-flow-id) marking in downlink (DL) packets; and
QoS-flow-id marking in uplink (UL) packets;
In some embodiments, the new AS protocol layer above the PDCP layer may be referred to as a "QoS layer." Other names, however, may be used herein to equivalently refer to this QoS layer (e.g., "PDAP layer" and "service data adaptation protocol (SDAP) layer," both of which may be used interchangeably with "QoS layer" herein). Accordingly, the new protocol layer above the PDCP may be referred to herein as the "PDAP layer," the "QoS layer," or the "SDAP layer."

Disclosed in some embodiments herein is performing of SDAP (or equivalently QoS or PDAP) concatenation to reduce processing overhead. Embodiments disclosed herein may concatenate multiple service data units (SDUs) (e.g., IP packets) in the SDAP layer into a single protocol data unit (PDU). In some embodiments, if one SDAP layer entity corresponds to multiple DRBs, then only SDUs belonging to the same DRB should be concatenated into the same PDU. Also, in some embodiments, when header compression is configured in the SDAP layer, the concatenation function can be performed after header compression.

When SDUs are concatenated in the SDAP layer above the PDCP layer, the header overhead of the PDCP, radio link control (RLC), and medium access control (MAC) layers can be reduced. The gain from this reduction of header overhead may be especially significant when the payload size is small (e.g., voice over internet protocol (VoIP) packet and transmission control protocol (TCP) acknowledgements (ACKs)). This can improve the coverage and capacity significantly. For high data rates, the processing overhead can be also reduced.

Compared with concatenation in the PDCP layer, concatenation in the SDAP layer above the PDCP layer has the benefit that there is less cross layer interaction. The reason for this is that the SDAP layer is adjacent to the internet protocol (IP) layer, and the SDAP layer can therefore utilize a "total length" field from the IP layer for SDU reassembly in the receiver side. Another benefit is that one single QoS-flow-id can be shared by multiple SDUs. As a result, the overall header overhead can be reduced.

Embodiments herein may include concatenation of multiple SDUs (e.g., IP packets) in the SDAP layer into a single PDU. If one SDAP layer entity corresponds to multiple DRBs, then only SDUs belonging to the same DRB should be concatenated. When header compression is configured in the SDAP layer, the concatenation function can be performed after header compression. Examples of transmitting and receiving side processing are discussed below with reference to FIGS. 1A and 1B.

FIG. 1A is a simplified flowchart illustrating a method 100 of transmitting data, according to some embodiments. By way of non-limiting example, a cellular communication device (e.g., a user equipment (UE), a next generation NodeB (gNB), a mobile management entity (MME), etc.) may be configured to perform the method 100. The method 100 may optionally include header compression 110 of SDUs (e.g., IP packets) from a layer higher than the PDCP. In some embodiments, however, this header compression 110 may not be performed.

The method 100 includes concatenation 120 of the SDUs into one or more PDUs. In some embodiments, the concatenation 120 occurs in the SDAP layer. The method 100 also includes QoS-flow-id marking 130 of the PDUs including the concatenated SDUs. Finally, the method 100 includes routing 140 the PDUs.

FIG. 1B is a simplified flowchart illustrating a method 150 of receiving data (e.g., data that has been transmitted using the method 100 of FIG. 1A), according to some embodiments. The receiving may be performed by a cellular data communication device (e.g., a UE, a gNB, an MME, etc.). By way of non-limiting example, the method of transmitting 100 may be performed by a UE, and the method of receiving 150 may be performed by a gNB. Also by way of non-limiting example, the method of transmitting 100 may be performed by a gNB, and the method of receiving 150 may be performed by a UE.

The method 150 includes SDU reassembly 160. This SDU reassembly 160 may occur in the SDAP layer. SDU reassembly 160 may include extracting SDUs that are concatenated into PDUs. The method 150 also optionally includes header decompression 170 (e.g., if header compression 110 was used by the transmitting device).

There may be at least two modes (Mode A and Mode B) for the concatenation function in the SDAP layer:

Mode A: no framing information is added in an SDAP layer header of the PDU including the concatenated SDUs. This mode can be used, for example, when SDUs contain framing information and header compression are not used. For example, IP packets (when header compression is not used) contain a "total length" field that indicates entire packet size (e.g., including header and data, in bytes). Therefore even if there is no framing information in the SDAP header, IP packets can still be reassembled in the receiver side based on IP headers.

Mode B: framing information in the SDAP header. This option can be used, for example, when SDUs do not contain framing information or when header compression is used. One possible PDU format is to reuse long term evolution (LTE) RLC design with extensible length indicators (LIs), with an example thereof discussed below with reference to FIG. 2.

Figure 2:
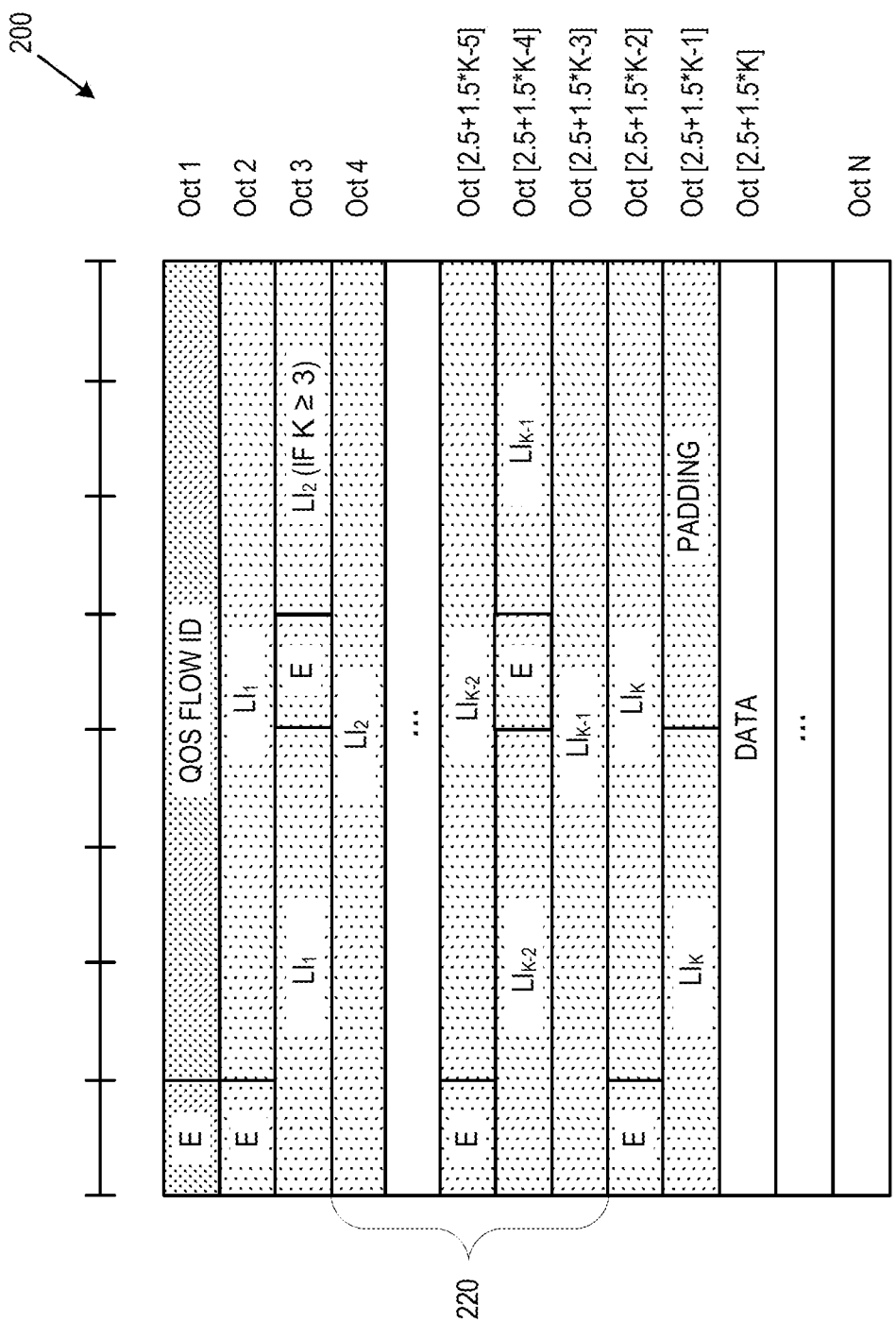
FIG. 2 is a simplified example of SDAP layer PDU format, according to some embodiments.

FIG. 2 is a simplified example of SDAP layer PDU 200 format, according to some embodiments. Following is an example description of the fields of the PDU 200 of FIG. 2, including various extension bit fields (Es), various LIs, and a QoS-flow-id field. It should be noted that the length of the QoS-flow-id field and the LIs shown in the PDU 200 of FIG. 2 are just examples and can be changed depending on configuration.

QoS-flow-id is the identification to mark the QoS flow.

E field. The length is one (1) bit. The E field indicates whether a Data field follows or a set of an E field and an LI field follows. An example interpretation of the E field is provided in Table 1 and Table 2 below.

TABLE 1

E field interpretation (for E field in the fixed part of the header)

| VALUE | DESCRIPTION |
|---|---|
| 0 | Data field follows from the octet following the fixed part of the header |
| 1 | A set of E field and LI field follows from the octet following the fixed part of the header |

TABLE 2

E field interpretation (for E field in the extension part of the header)

| VALUE | DESCRIPTION |
|---|---|
| 0 | Data field follows from the octet following the LI field following this E field |
| 1 | A set of E field and LI field follows from the bit following the LI field following this E field |

LI field. The LI field indicates the length in bytes of the corresponding Data field element present in the SDAP layer data PDU. The first LI present in the SDAP layer data PDU header corresponds to the first Data field element present in the Data field of the SDAP layer data PDU, the second LI present in the SDAP layer data PDU header corresponds to the second Data field element present in the Data field of the SDAP layer data PDU, and so on.

The PDU may also include Padding, in some instances.

FIG. 2 illustrates octets Oct 1, 2, 3, 4, Oct [2.5+1.5*K−5], [2.5+1.5*K−4], [2.5+1.5*K−3], [2.5+1.5*K−2], [2.5+1.5*K−1], and Oct N. FIG. 2 also indicates a portion 220 of the PDU 200 that is present if K is greater than or equal to 3 (K≥3). As a result, FIG. 2 illustrates SDAP layer PDU format with 11 bit LI (odd number of LIs, i.e., K=1, 3, 5, . . . ).

In the PDU 200 of FIG. 2, the length indicator fields are located in the beginning of the PDU (e.g., in the header region). It is also possible that the length indicator field of a corresponding SDU is placed immediately before the corresponding SDU, as discussed below with reference to FIG. 3.

Figure 3:
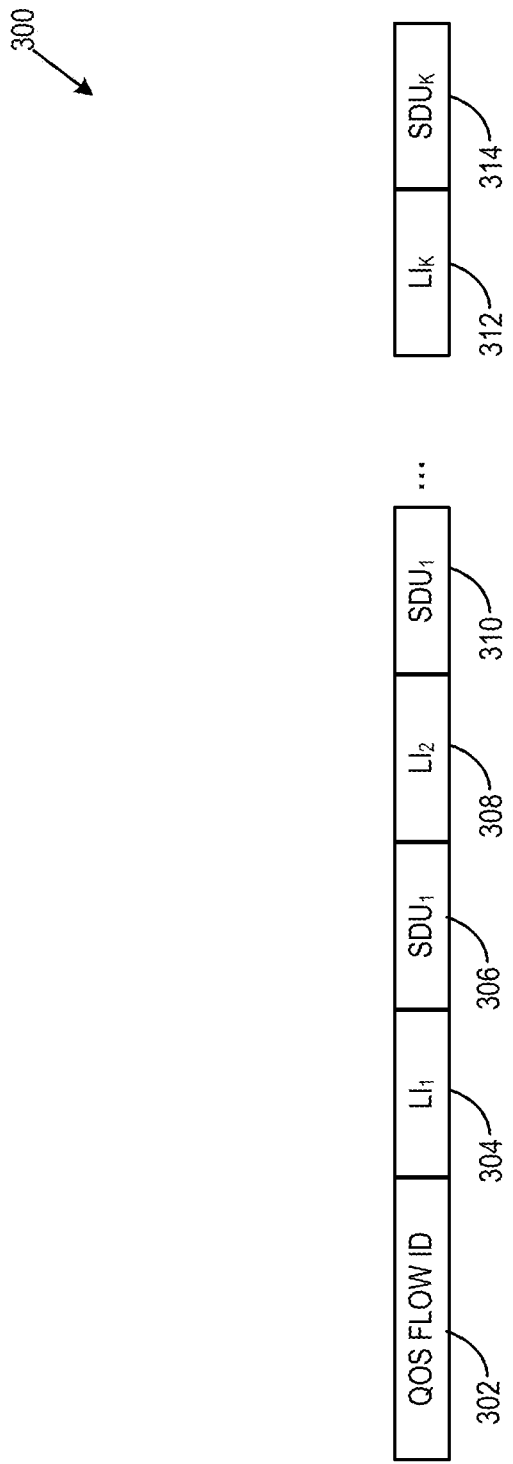
FIG. 3 is a simplified example of SDAP layer PDU format, according to some embodiments.

FIG. 3 is a simplified example of SDAP layer PDU 300 format, according to some embodiments. The PDU 300 includes a QoS-flow-id field, LI fields 304, 310, . . . , and 312, and SDU fields 306, 310, and 314.

Since multiple QoS flows can be multiplexed into a single DRB, when concatenating multiple SDUs, there are at least two options (Options A and B):

Option A: within one SDAP layer data PDU, there is only one QoS flow. This means that only one QoS-flow-id is present in the header. FIGS. 2 and 3 are examples of Option A.

Option B: within one SDAP layer data PDU, SDUs of multiple QoS flows can be concatenated. In Option B, QoS-flow-id for each SDU should be indicated. One sub-option is that for each SDU, the corresponding QoS-flow-id is explicitly signaled. Another sub-option is that SDUs corresponding to the same QoS-flow-id are consecutive in the PDU. Then for each QoS-flow-id, the corresponding number of SDUs is signaled.

SDAP Enhancements to Support IP Concatenation in 5G

Next generation cellular systems are expected to provide very high peak data rate (e.g., 10 gigabits per second (Gbps)) by using high frequency band/spectrum (e.g., millimeter wave (mmWave)). In accordance with the peak data rate requirement, 5G new radio (NR) is aimed at achieving tens of Gbps in DL and uplink UL (e.g., DL: 20 Gbps, UL: 10 Gbps). Since TCP uses acknowledgements to the sender, DL data download using TCP also consumes UL radio resources to deliver TCP ACKs. A typical internet protocol (IP) packet size of a TCP ACK is 52 bytes, which include 32 bytes of a TCP header with a TCP selective acknowledgement (SACK) option plus 20 bytes of an IPv4 header. If IPv6 is used, it is enlarged to 72 bytes due to the increased IP header (40 bytes). By comparing with a typical IP packet size of a TCP segment, 1500 bytes, the UL data rate used for the target DL data rate can be derived. On the other hand, the TCP receiver side does not issue a TCP ACK for every TCP segment thanks to delayed ACKs. In a stream of full-sized segments, there should be an ACK for at least every second segment. Typical TCP implementations follow this behavior. Table 3 shows the UL data rate used for achieving the target DL peak rate, i.e., 20 Gbps in the case of IPv4/v6. Several hundreds of Mbps of UL are used for a DL of 20 Gbps over the radio protocols. Even for a DL of 5 Gbps, around 100 Mbps are used in UL. On the other hand, packet data convergence protocol (PDCP) and radio link control (RLC) processing in 5G new radio NR is per IP packet, and this may lead to the following problems:

High CPU overhead
High power consumption
High heat dissipation
Limit on the PDCP Ciphering engine capability Proposed herein is concatenation of multiple (small) IP packets into a single IP packet (IP concatenation), thereby reducing packet processing overhead of the 5G protocol stack (e.g., processing of the PDCP and RLC layers).

Figure 4:
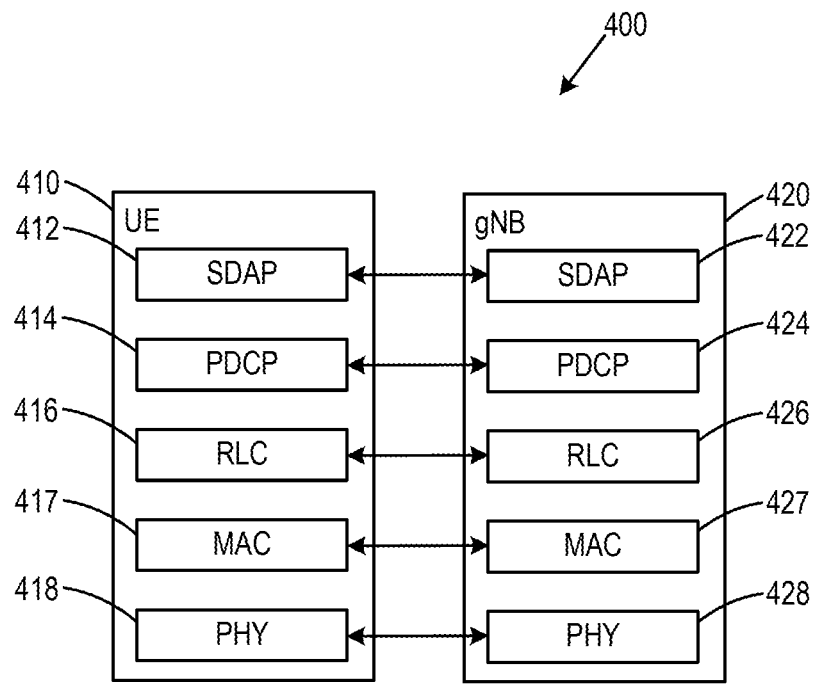
FIG. 4 is a simplified illustration of a 5G NR user plane protocol stack, according to some embodiments.

FIG. 4 is a simplified illustration of a 5G NR user plane (u-plane protocol stack 400, according to some embodiments. The u-plane protocol stack 400 includes a physical layer 418, 428, a MAC layer 417, 427, an RLC layer 416, 426, and a PDCP layer 414, 424 for a UE 410 and a gNB 420. FIG. 4 also shows a new SDAP layer 412, 422, which is introduced to handle mapping between QoS flows and a data radio bearer (DRB). This can be supported either as part of the new SDAP layer 412, 422, or over the top of SDAP. Whether the mapping between QoS flows and DRBs is performed in the SDAP layer 412, 422 or over the top of the SDAP layer 412, 422 makes little impact on the existing SDAP or PDCP functions. Also, the proposed IP concatenation operation can be performed on a per UE, per DRB, or per QoS flow basis.

TABLE 3

UL data rate used for achieving DL peak rate

| | UL data rate | |
|---|---|---|
| DL peak rate | IPv4 | IPv6 |
| 5 Gbps | 86.7 Mbps | 120 Mbps |
| 20 Gbps | 346.7 Mbps | 480 Mbps |

Figure 5:
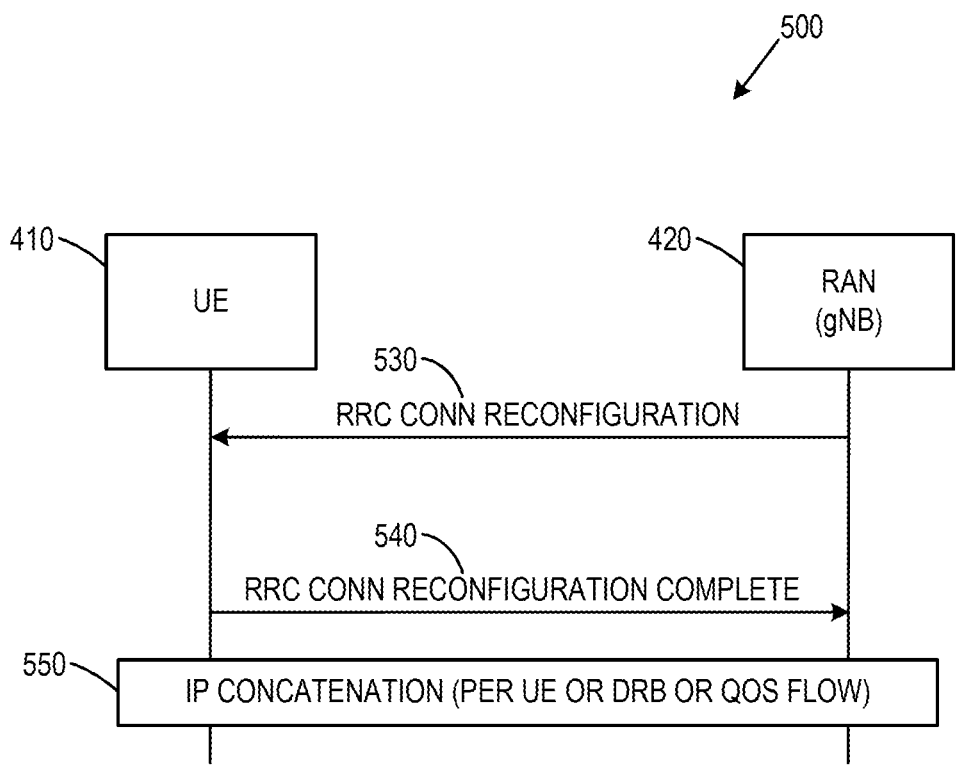
FIG. 5 is a simplified signal flow diagram of configuring concatenation, according to some embodiments.

FIG. 5 is a simplified signal flow diagram 500 of configuring concatenation, according to some embodiments. For example, FIG. 5 shows proposed IP concatenation control call flow between a UE 410 and a gNB 420. The signaling includes the following two acts:

Act 1: Radio access network (RAN)—the gNB 420 sends, to the UE 410, a radio resource control (RRC) Conn Reconfiguration Message 530 with a new IP Concatenation Configuration (Config) field to indicate whether IP concatenation is enabled or disabled. If the IP concatenation is enabled, the RRC Conn Reconfiguration Message 530 indicates whether the IP concatenation is operated on a per-UE, per-DRB or per-QoS Flow basis. If the IP concatenation is operated on a per-UE basis, the RRC Conn Reconfiguration Message 530 includes the following two parameters: a Maximum Concatenation Delay (the maximum latency the UE (or gNB) will hold a UL (or DL) packet for concatenation), and a Maximum Concatenation Size (the maximum length of the IP packet after concatenation). If the IP concatenation is operated on a per-DRB basis, the RRC Conn Reconfiguration Message 530 includes, for each DRB: a DRB ID of the DRB, a Maximum Concatenation Delay, and a Maximum Concatenation Size. If the IP concatenation is operated on a per-QoS flow basis, the RRC Conn Reconfiguration Message 530 includes, for each QoS flow: a DRB ID of the flow, a QoS-flow-id of the flow, a Maximum Concatenation Delay, and a Maximum Concatenation Size.

Act 2: The UE 410 sends, to the gNB 420, the RRC Conn Reconfiguration Complete Message 540 with the new IP Concatenation Config fields to indicate whether IP concatenation is enabled or not (e.g., disabled). If it is enabled, UE 410 and gNB 420 will start per-UE, per-DRB, or per-QoS flow IP concatenation accordingly.

Per-UE IP concatenation: the same control parameters will be used for all DRBs and QoS flows. Moreover, IP packets of different QoS flows may be concatenated as long as they are mapped to the same DRB.

Per-DRB IP concatenation: the same control parameters can only be used for the same DRB. Moreover, IP packets of different QoS flows may be concatenated as long as they are mapped to the same DRB.

Per-QoS Flow IP concatenation: the same control parameters can only be used for the same QoS flow. Moreover, only IP packets of the same QoS flow may be concatenated.

Once the configuration messages 530, 540 have been sent, IP concatenation 550 according to the parameters of the messages 530, 540 may be performed by the UE 410 and the gNB 420.

Figure 6:
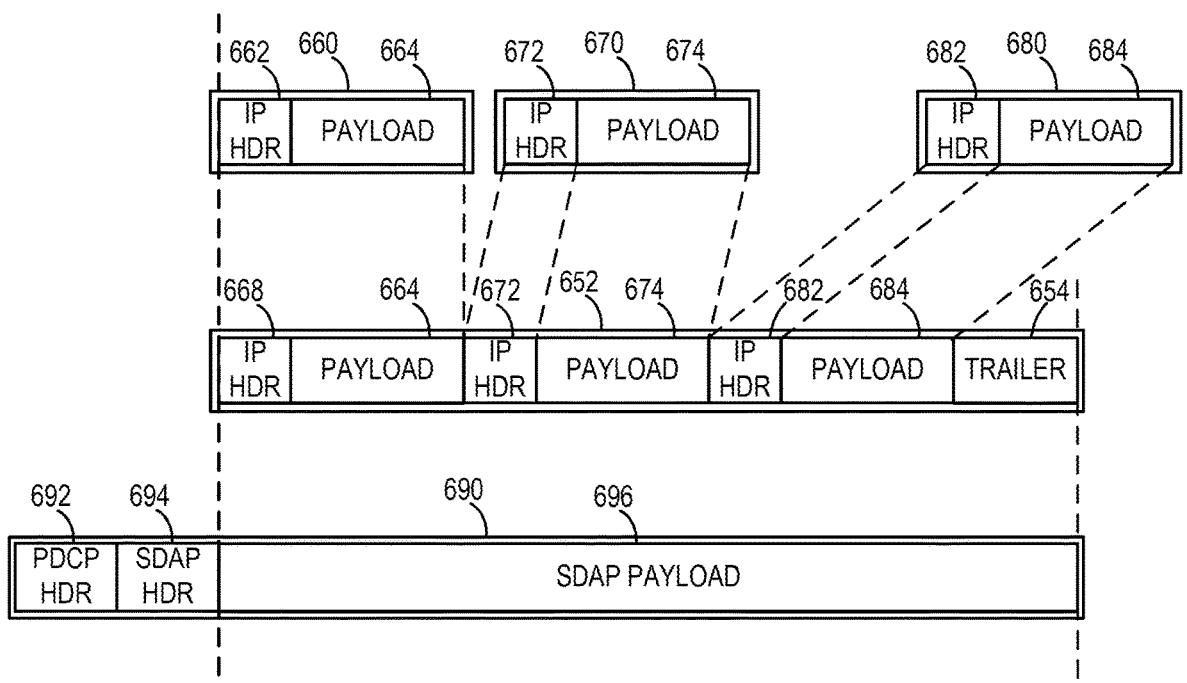
FIG. 6 is a simplified illustration of contents of a concatenated packet including IP packets, according to some embodiments.

FIG. 6 is a simplified illustration of contents of a concatenated packet 690 including IP packets 660, 670, 680, according to some embodiments. FIG. 6 shows an example of one proposed protocol data unit (PDU) format for IP concatenation. As shown in FIG. 6, the transmitter side may concatenate multiple IP packets 660, 670, 680 into a single concatenated IP packet 690, and add a "trailer" 654 to the end. The IP header 662 of the first IP packet service data unit (SDU) 660 will be used as the IP header 668 of the combined IP packet 690 with the following changes:

- Protocol Type: set to a special value (e.g., 61) to indicate that this packet 690 carries multiple IP packets 660, 670, 680.
- Packet Length: set to the total length of all concatenated IP packets 660, 670, 680.

The trailer 654 should carry the following information:

- Protocol Type (1B): set to the original value of the protocol type of the first IP packet 660 in the PDU 652.
- Packet Length (2B): set to the length of the first IP packet 660.

The trailer information can be then used by the receiver side to recover the original IP header 662 of the first IP packet 660.

As illustrated in FIG. 6, the concatenated packet 690 includes a PDCP header 692, an SDAP header 694, and an SDAP payload 796. The SDAP payload 796 includes the PDU 652. In turn, the PDU 652 includes the IP header 668 of the combined IP packet 690, a payload 664 of the first IP packet, IP headers 672, 682 of the other IP packets 670, 680, and payloads 674, 684 of the other IP packets 670, 680.

Figure 7:
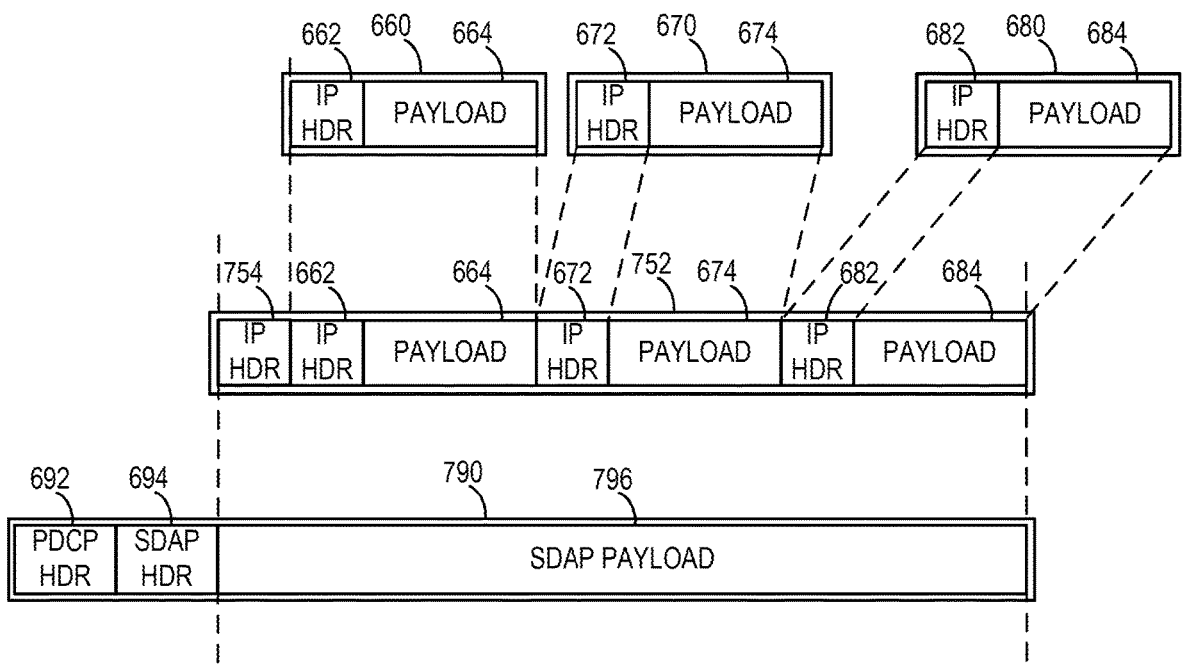
FIG. 7 is a simplified illustration of contents of a concatenated packet including IP packets according to some embodiments.

In some embodiments, the IP header 662 of the first IP packet 660 may be duplicated and added to the beginning of a PDU 752 (FIG. 7) with the same changes made thereto as discussed above with reference to the IP header 668 of FIG. 6. FIG. 7 illustrates one such example.

FIG. 7 is a simplified illustration of contents of a concatenated packet 790 including IP packets 660, 670, 680, according to some embodiments. A PDU 752 of FIG. 7 includes each of the IP headers 662, 672, 682 of the IP packets 660, 670, 680 without modifying the IP header 662 of the first IP packet 660. Instead, an additional IP header 754 including the same information as the IP header 668 of FIG. 6 is added to the front of the PDU 752. The PDU 752 also includes the payloads 664, 674, and 684 of the IP packets 660, 670, and 680. In the example of FIG. 7, no changes are made to the IP header 662 of the first IP packet 660, and the trailer 654 (FIG. 6) is not included. As a result, the concatenated packet 790 includes a PDCP header 692, an SDAP header 694, and an SDAP payload 796, which in turn includes the PDU 752.

Figure 8:
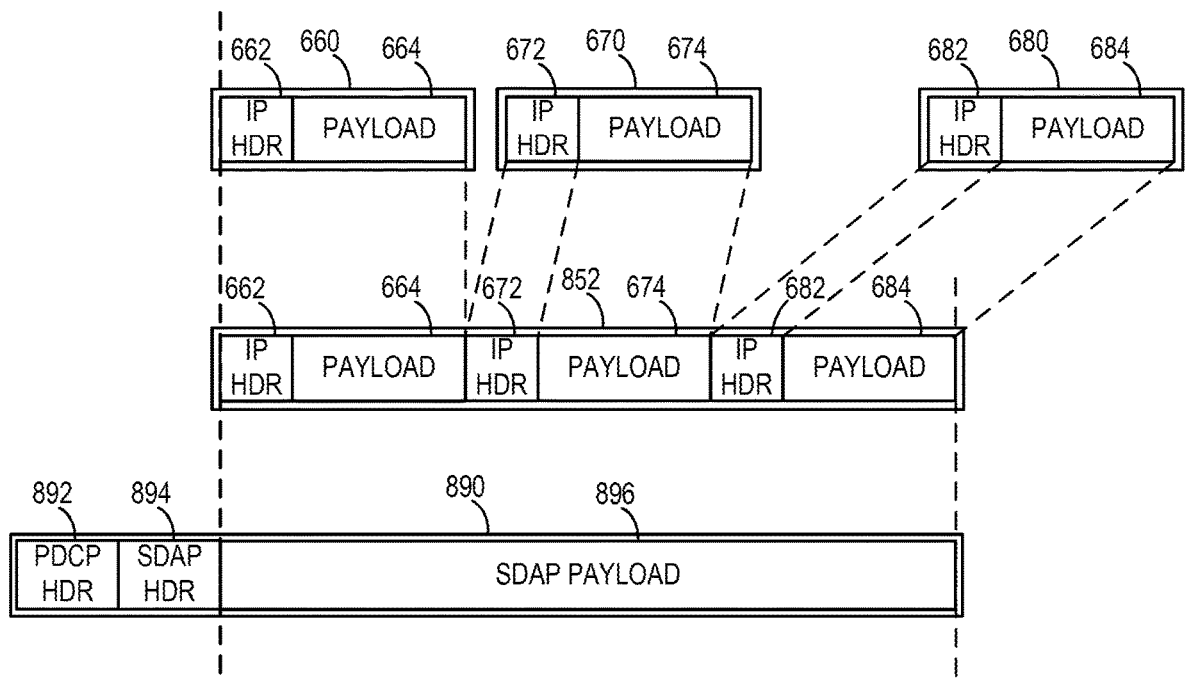
FIG. 8 is a simplified illustration of contents of a concatenated packet including IP packets, according to some embodiments.

In some embodiments, a new bit field may be added to the PDCP header 692 or the SDAP header 694 to form a new PDCP header 892 (FIG. 8) or a new SDAP header (894) that indicates if the SDAP payload contains multiple IP packets or not. FIG. 8 illustrates an example of such an embodiment.

FIG. 8 is a simplified illustration of contents of a concatenated packet 890 including IP packets 660, 670, and 680, according to some embodiments. A PDU 852 of FIG. 8 includes each of the IP headers 662, 672, and 682 of the IP packets 660, 670, and 680 without modifying the IP header 662 of the first IP packet 660, without including a trailer 654 (FIG. 6), and without including an additional IP header 754 (FIG. 7). As a result, since the PDCP header 892 or the SDAP header 894 indicates that the PDU 852 contained in the payload 896 includes multiple IP packets 660, 670, and 680, the IP packets 660, 670, and 680 may simply be put together into one SDAP payload 896.

Although the PDUs 652, 752, and 852 of FIGS. 6-8 above are discussed in terms of including three IP packets 660, 670, and 680, it will be apparent to those of ordinary skill in the art that the disclosure also encompasses any number of IP packets in the PDUs 652, 752, and 852 other than three.

Figure 9:
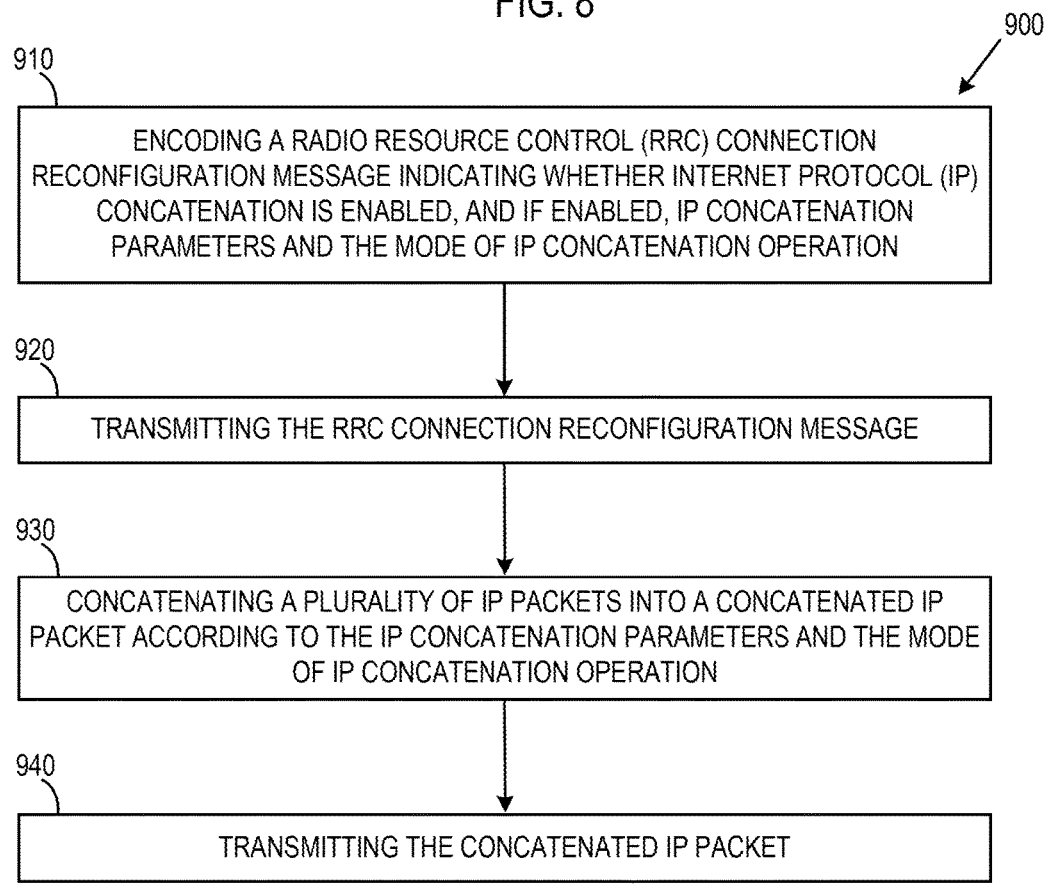
FIG. 9 is a simplified flowchart illustrating a method of operating one or more devices, according to some embodiments.

FIG. 9 is a simplified flowchart illustrating a method 900 of operating one or more devices, according to some embodiments. In some embodiments, the one or more devices include an electronic device(s), network(s), system(s), chip(s) or component(s), or portions or implementations thereof, including a base station, of FIGS. 11, 12, 13, 14, 15, 16, or some other figure herein may be configured to perform one or more processes, techniques, or methods as described herein, or portions thereof. For example, the method 900 may include encoding 910 or causing to encode a radio resource control (RRC) connection reconfiguration message indicating whether internet protocol (IP) concatenation is enabled, and, if enabled, IP concatenation parameters and the mode of IP concatenation operation. The method 900 also includes transmitting 920 or causing to transmit the RRC connection reconfiguration message. The method 900 further includes, when IP concatenation is enabled, concatenating 930 or causing to concatenate a plurality of IP packets into a concatenated IP packet according to the IP concatenation parameters and the mode of IP concatenation operation. The method 900 also includes transmitting 940 or causing to transmit the concatenated IP packet.

Figure 10:
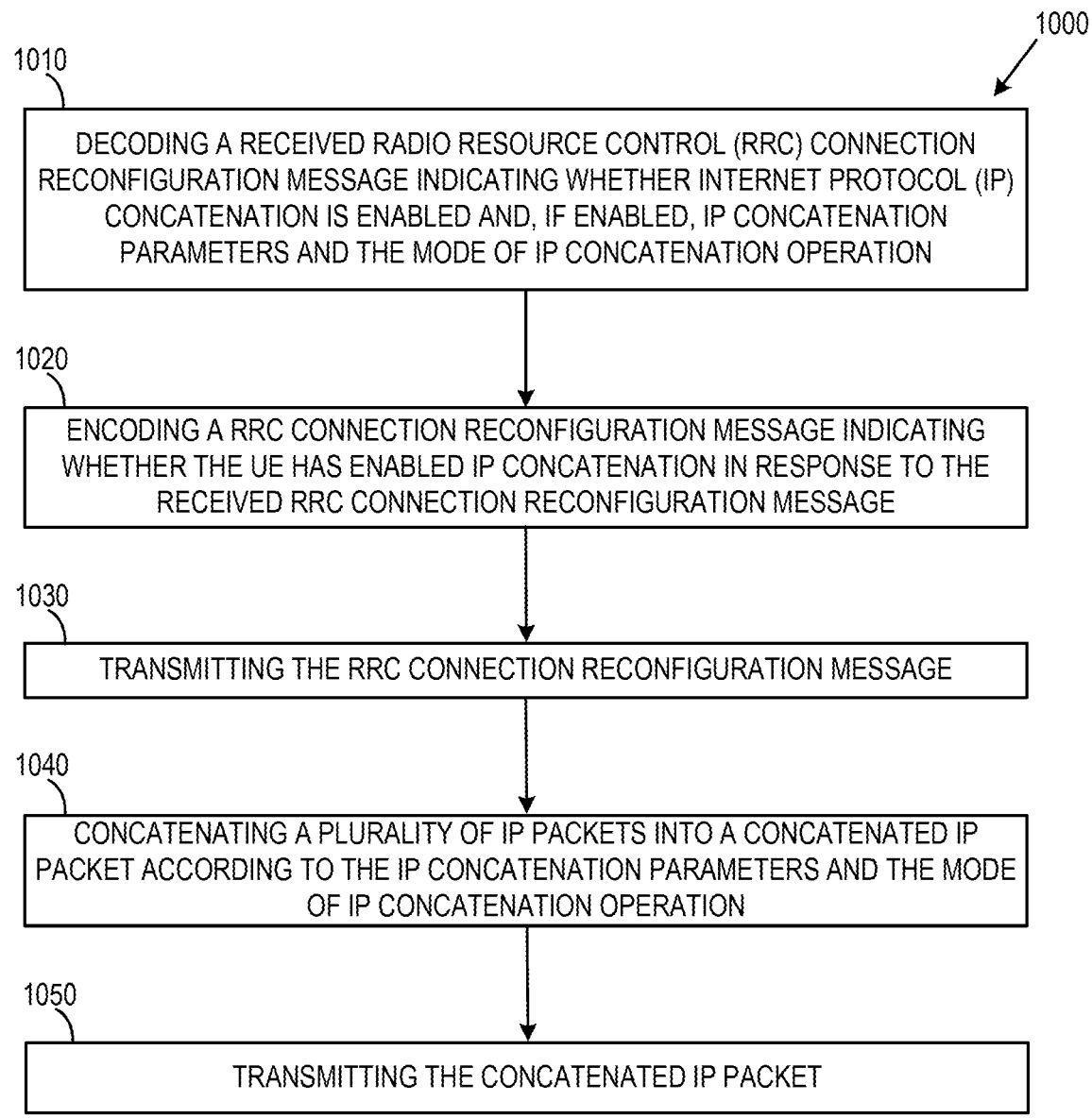
FIG. 10 is a simplified flowchart illustrating a method of operating one or more devices, according to some embodiments.

FIG. 10 is a simplified flowchart illustrating a method 1000 of operating one or more devices, according to some embodiments. In some embodiments, the one or more devices include an electronic device(s), network(s), system(s), chip(s) or component(s), or portions or implementations thereof, including a user equipment, of FIGS. 11, 12, 13, 14, 15, 16, or some other figure herein may be configured to perform one or more processes, techniques, or methods as described herein, or portions thereof. The method 1000 includes decoding 1010 or causing to decode a received radio resource control (RRC) connection reconfiguration message indicating whether internet protocol (IP) concatenation is enabled and, if enabled, IP concatenation parameters and the mode of IP concatenation operation. The method 1000 also includes encoding 1020 or causing to encode an RRC connection reconfiguration message indicating whether the UE has enabled IP concatenation in response to the received RRC connection reconfiguration message. The method 1000 further includes transmitting 1030 or causing to transmit the RRC connection reconfiguration message, and when IP concatenation is enabled, concatenating 1040 or causing to concatenate a plurality of IP packets into a concatenated IP packet according to the IP concatenation parameters and the mode of IP concatenation operation. The method also includes transmitting 1050 or causing to transmit the concatenated IP packet.

Figure 11:
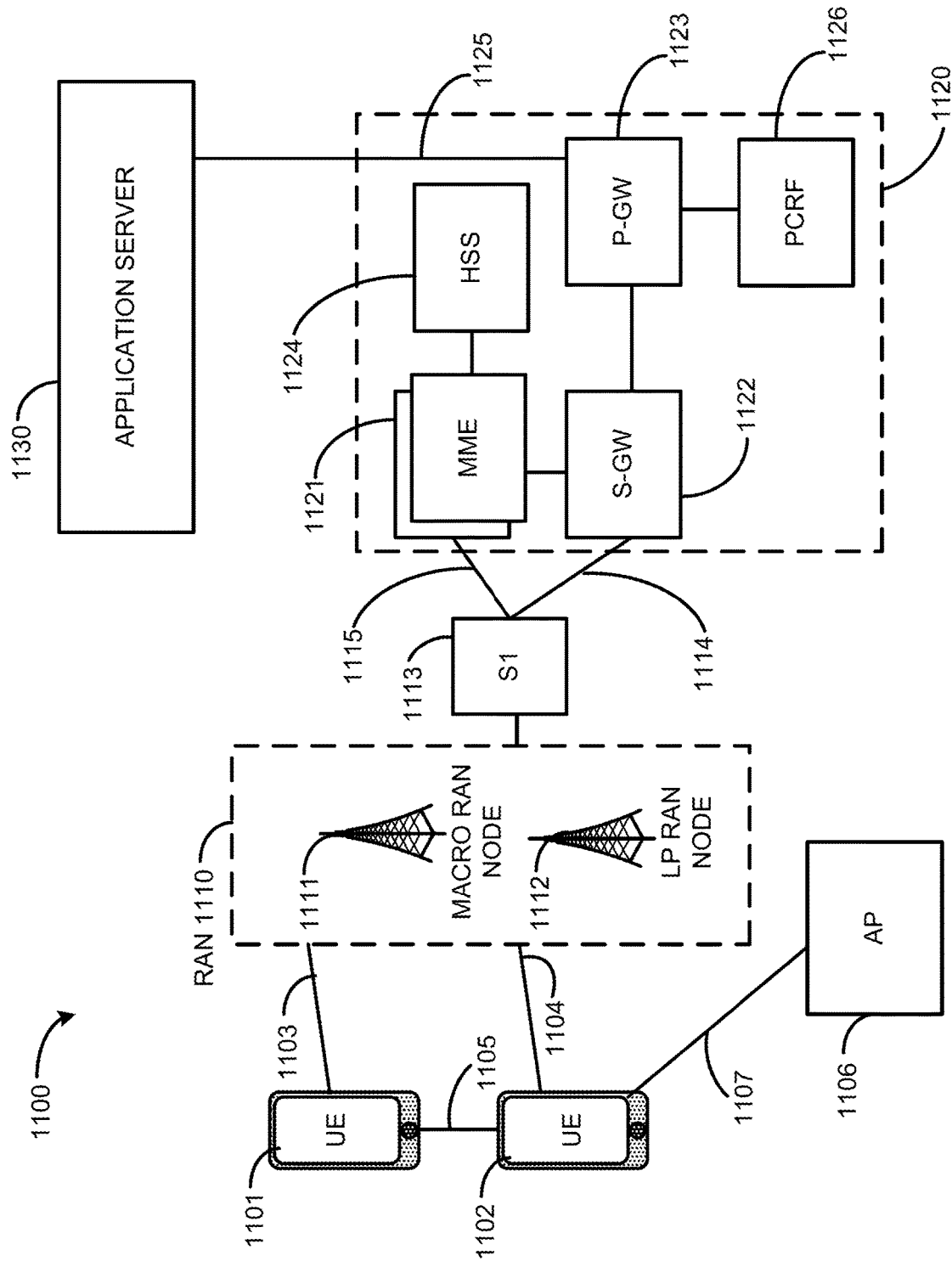
FIG. 11 illustrates an architecture of a system of a network in accordance with some embodiments.

FIG. 11 illustrates an architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110. The RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance with various communication techniques, such as, but not limited to, an Orthogonal Frequency-Division Multiple Access (OFDMA) communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and HARQ (Hybrid Automatic Repeat Request) information related to the uplink shared channel. Typically, downlink scheduling (assigning control and shared channel resource blocks to the UE 1102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 1110 is shown to be communicatively coupled to a core network (CN) 1120 via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 comprises the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and route data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network (e.g., the CN 1123) and external networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN, and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
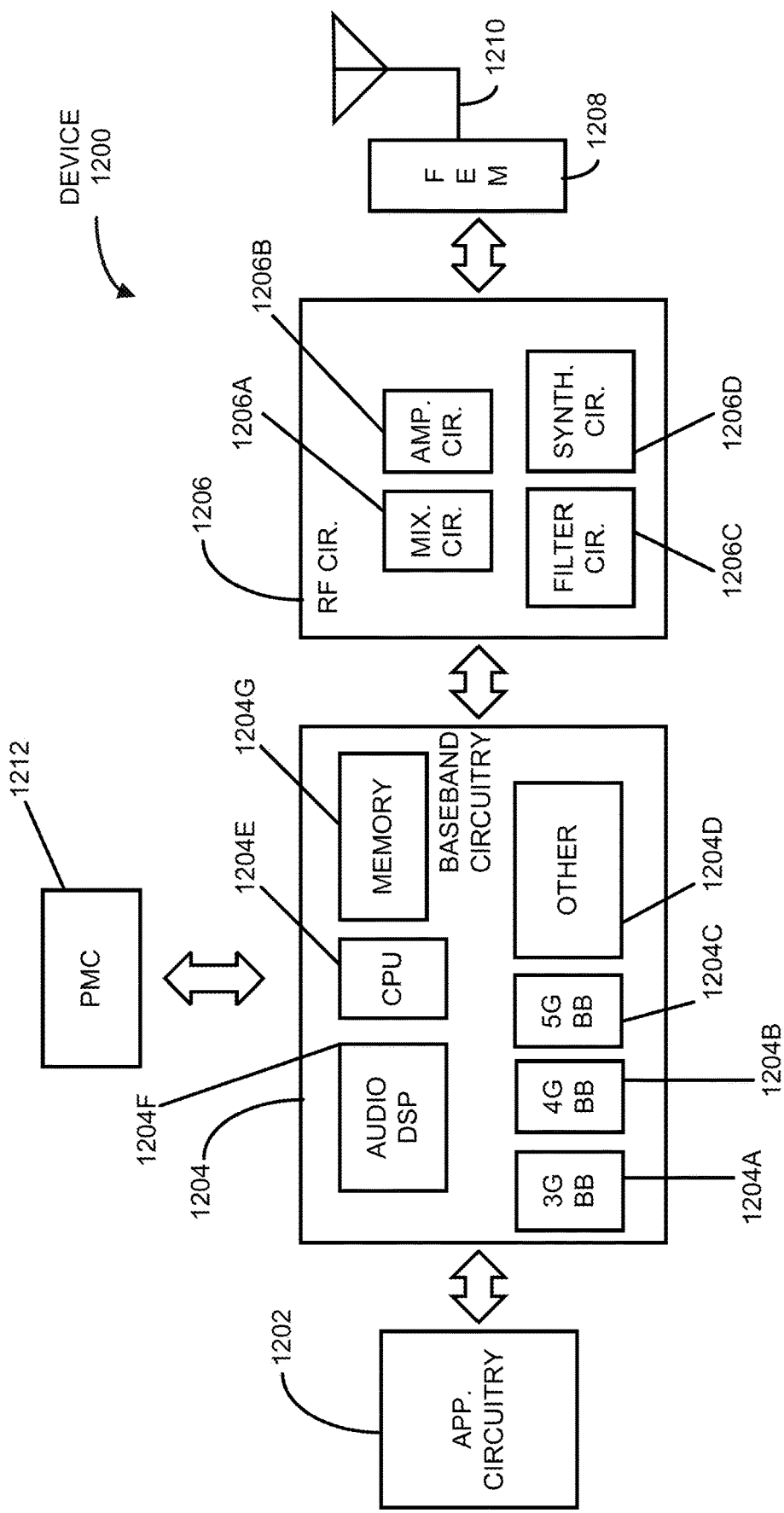
FIG. 12 illustrates example components of a device in accordance with some embodiments.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include fewer elements (e.g., a RAN node may not utilize application circuitry 1202, and instead may include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuity 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or generations to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206*d* of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 1202, RF circuitry 1206, or FEM 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it transitions back to the RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
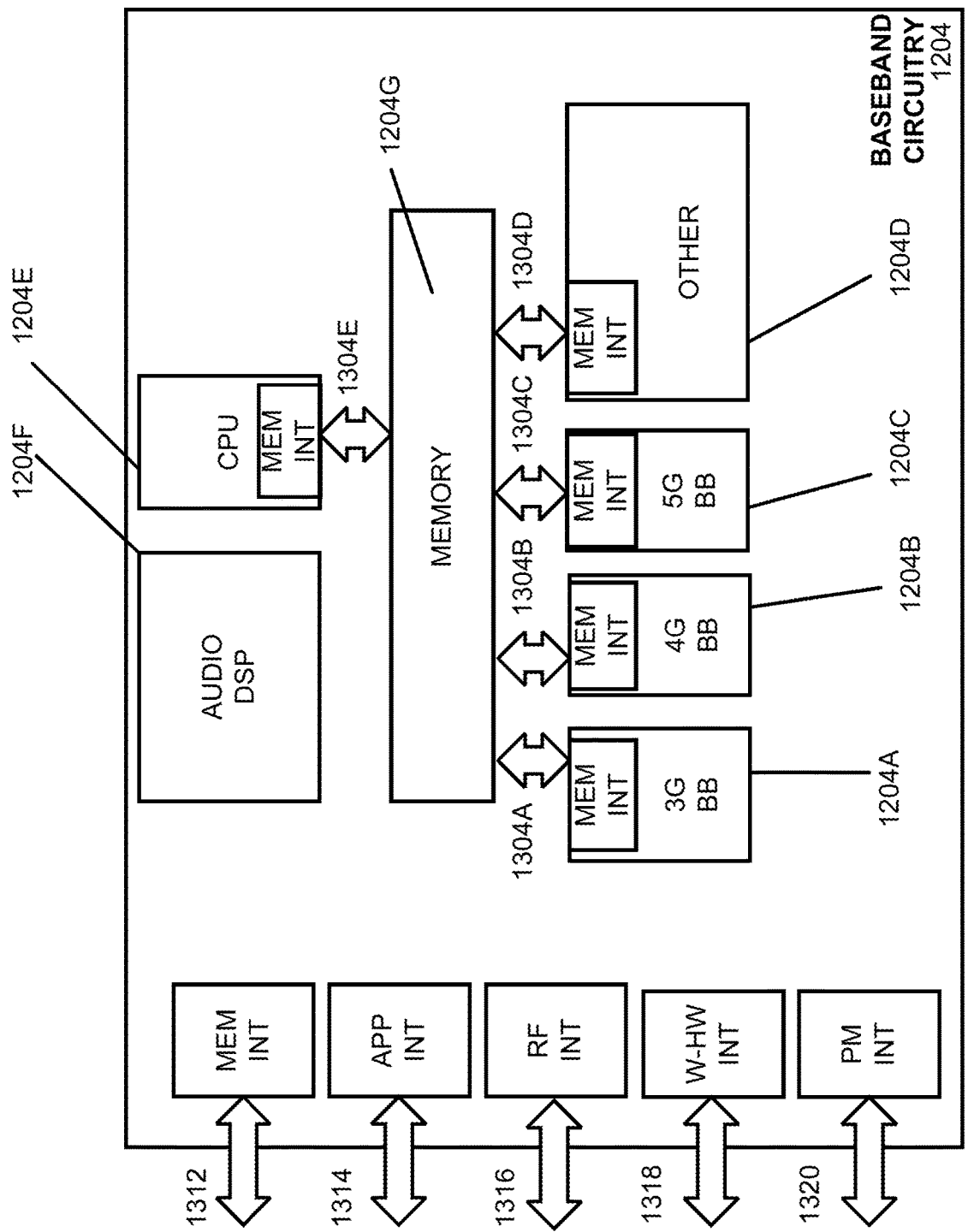
FIG. 13 illustrates example interfaces of baseband circuitry in accordance with some embodiments.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
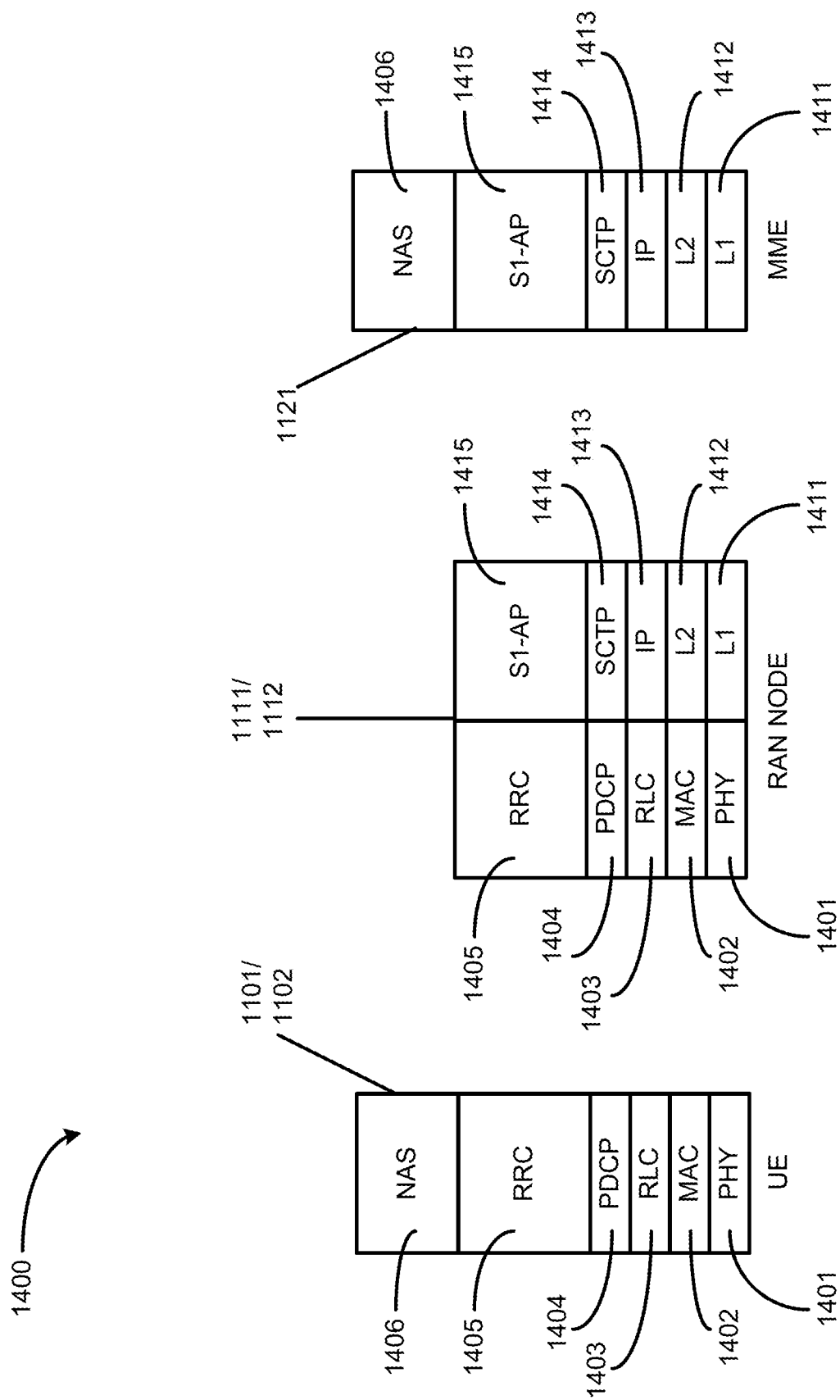
FIG. 14 is an illustration of a control plane protocol stack in accordance with some embodiments.

FIG. 14 is an illustration of a control plane protocol stack in accordance with some embodiments. In this embodiment, a control plane 1400 is shown as a communications protocol stack between the UE 1101 (or alternatively, the UE 1102), the RAN node 1111 (or alternatively, the RAN node 1112), and the MME 1121.

The PHY layer 1401 may transmit or receive information used by the MAC layer 1402 over one or more air interfaces. The PHY layer 1401 may further perform link adaptation or adaptive modulation and coding (AMC), power control, cell search (e.g., for initial synchronization and handover purposes), and other measurements used by higher layers, such as the RRC layer 1405. The PHY layer 1401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1403 may operate in a plurality of modes of operation, including: Transparent Mode (TM), Unacknowledged Mode (UM), and Acknowledged Mode (AM). The RLC layer 1403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1101 and the RAN node 1111 may utilize a Uu interface (e.g., an LTE-Uu interface) to exchange control plane data via a protocol stack comprising the PHY layer 1401, the MAC layer 1402, the RLC layer 1403, the PDCP layer 1404, and the RRC layer 1405.

The non-access stratum (NAS) protocols 1406 form the highest stratum of the control plane between the UE 1101 and the MME 1121. The NAS protocols 1406 support the mobility of the UE 1101 and the session management procedures to establish and maintain IP connectivity between the UE 1101 and the P-GW 1123.

The S1 Application Protocol (S1-AP) layer 1415 may support the functions of the S1 interface and comprise Elementary Procedures (EPs). An EP is a unit of interaction between the RAN node 1111 and the CN 1120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1414 may ensure reliable delivery of signaling messages between the RAN node 1111 and the MME 1121 based, in part, on the IP protocol, supported by the IP layer 1413. The L2 layer 1412 and the L1 layer 1411 may refer to communication links (e.g., wired or wireless) used by the RAN node and the MME to exchange information.

The RAN node 1111 and the MME 1121 may utilize an S1-MME interface to exchange control plane data via a protocol stack comprising the L1 layer 1411, the L2 layer 1412, the IP layer 1413, the SCTP layer 1414, and the S1-AP layer 1415.

Figure 15:
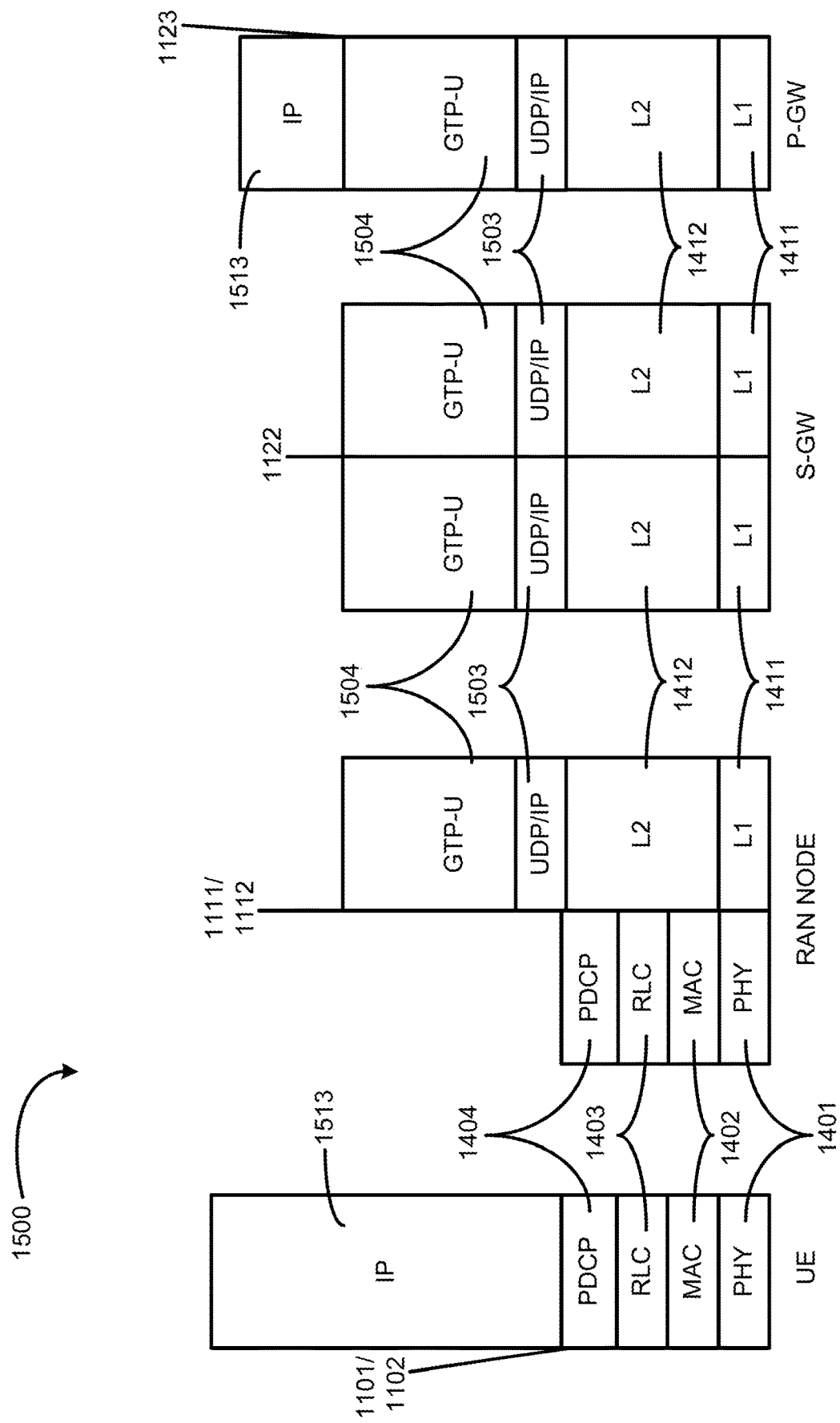
FIG. 15 is an illustration of a user plane protocol stack in accordance with some embodiments.

FIG. 15 is an illustration of a user plane protocol stack in accordance with some embodiments. In this embodiment, a user plane 1500 is shown as a communications protocol stack between the UE 1101 (or alternatively, the UE 1102), the RAN node 1111 (or alternatively, the RAN node 1112), the S-GW 1122, and the P-GW 1123. The user plane 1500 may utilize at least some of the same protocol layers as the control plane 1400. For example, the UE 1101 and the RAN node 1111 may utilize a Uu interface (e.g., an LTE-Uu interface) to exchange user plane data via a protocol stack comprising the PHY layer 1401, the MAC layer 1402, the RLC layer 1403, the PDCP layer 1404.

The General Packet Radio Service (GPRS) Tunneling Protocol for the user plane (GTP-U) layer 1504 may be used for carrying user data within the GPRS core network and between the radio access network and the core network. The user data transported can be packets in any of IPv4, IPv6, or PPP formats, for example. The UDP and IP security (UDP/IP) layer 1503 may provide checksums for data integrity, port numbers for addressing different functions at the source and destination, and encryption and authentication on the selected data flows. The RAN node 1111 and the S-GW 1122 may utilize an S1-U interface to exchange user plane data via a protocol stack comprising the L1 layer 1411, the L2 layer 1412, the UDP/IP layer 1503, and the GTP-U layer 1504. The S-GW 1122 and the P-GW 1123 may utilize an S5/S8a interface to exchange user plane data via a protocol stack comprising the L1 layer 1411, the L2 layer 1412, the UDP/IP layer 1503, and the GTP-U layer 1504. As discussed above with respect to FIG. 14, NAS protocols support the mobility of the UE 1101 and the session management procedures to establish and maintain IP connectivity between the UE 1101 and the P-GW 1123.

Figure 16:
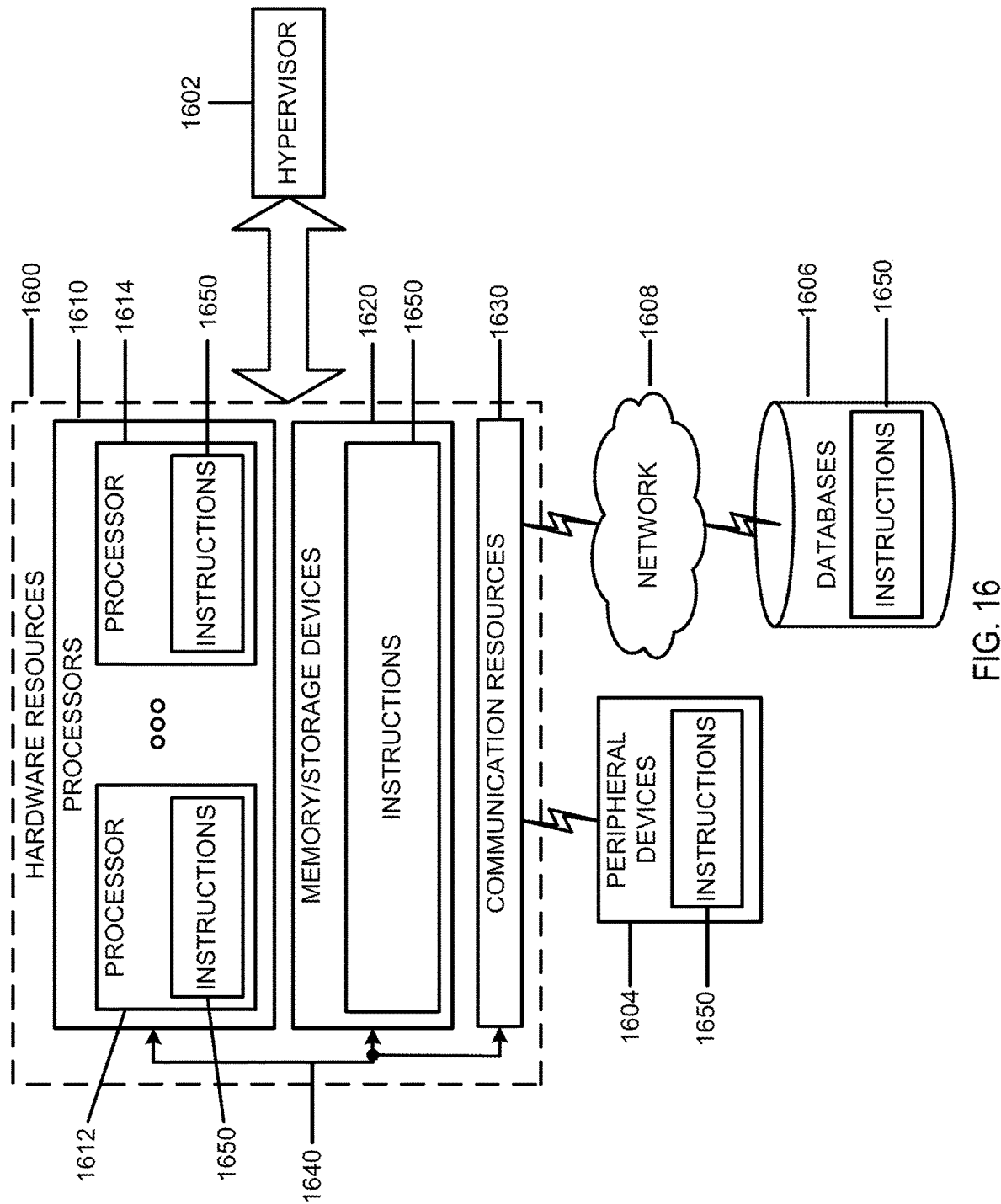
FIG. 16 is a block diagram illustrating components, according to some example embodiments.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640. For embodiments where node virtualization (e.g., NFV) is utilized, a hypervisor 1602 may be executed to provide an execution environment for one or more network slices/sub-slices to utilize the hardware resources 1600.

The processors 1610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1612 and a processor 1614.

The memory/storage devices 1620 may include main memory, disk storage, or any suitable combination thereof. The memory/storage devices 1620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

In embodiments, the device of FIGS. 12 and 16, and particularly the baseband circuitry of FIG. 13, may be a base station or part of a base station to encode a radio resource control (RRC) connection reconfiguration message indicating whether internet protocol (IP) concatenation is enabled, and, if enabled, IP concatenation parameters and the mode of IP concatenation operation; transmit the RRC connection reconfiguration message; and concatenate a plurality of IP packets into a concatenated IP packet according to the IP concatenation parameters and the mode of IP concatenation operation when IP concatenation is enabled.

In other embodiments, the device of FIGS. 12 and 16, and particularly the baseband circuitry of FIG. 13, may be a user equipment (UE) or part of a user equipment to decode a received radio resource control (RRC) connection reconfiguration message indicating whether internet protocol (IP) concatenation is enabled and, if enabled, IP concatenation parameters and the mode of IP concatenation operation; encode an RRC connection reconfiguration message indicating whether the UE has enabled IP concatenation in response to the received RRC connection reconfiguration message; transmit the RRC connection reconfiguration message; and concatenate a plurality of IP packets into a concatenated IP packet according to the IP concatenation parameters and the mode of IP concatenation operation, when IP concatenation is enabled.

Figure 17:
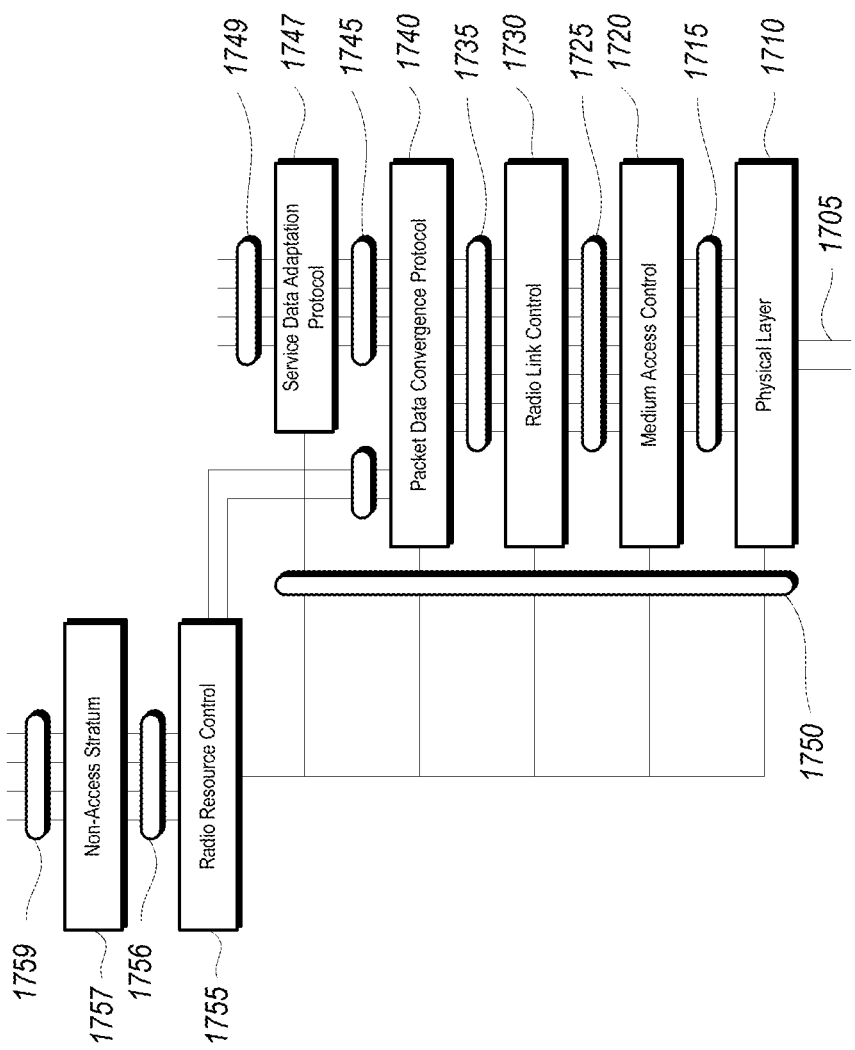
FIG. 17 is a simplified illustration of protocol functions that may be implemented in a wireless communication device according to some aspects.

FIG. 17 is a simplified illustration of protocol functions that may be implemented in a wireless communication device according to some aspects.

In some aspects, protocol layers may include one or more of physical layer (PHY) 1710, medium access control layer (MAC) 1720, radio link control layer (RLC) 1730, packet data convergence protocol layer (PDCP) 1740, service data adaptation protocol (SDAP) layer 1747, radio resource control layer (RRC) 1755, and non-access stratum (NAS) layer 1757, in addition to other higher layer functions not illustrated.

According to some aspects, protocol layers may include one or more service access points that may provide communication between two or more protocol layers.

According to some aspects, PHY 1710 may transmit and receive physical layer signals 1705 that may be received or transmitted respectively by one or more other communication devices. According to some aspects, physical layer signals 1705 may comprise one or more physical channels.

According to some aspects, an instance of PHY 1710 may process requests from and provide indications to an instance of MAC 1720 via one or more physical layer service access points (PHY-SAP) 1715. According to some aspects, requests and indications communicated via PHY-SAP 1715 may comprise one or more transport channels.

According to some aspects, an instance of MAC 1720 may process requests from and provide indications to an instance of RLC 1730 via one or more medium access control service access points (MAC-SAP) 1725. According to some aspects, requests and indications communicated via MAC-SAP 1725 may comprise one or more logical channels.

According to some aspects, an instance of RLC 1730 may process requests from and provide indications to an instance of PDCP 1740 via one or more radio link control service access points (RLC-SAP) 1735. According to some aspects, requests and indications communicated via RLC-SAP 1735 may comprise one or more RLC channels.

According to some aspects, an instance of PDCP 1740 may process requests from and provide indications to one or more of an instance of RRC 1755 and one or more instances of SDAP 1747 via one or more packet data convergence protocol service access points (PDCP-SAP) 1745. According to some aspects, requests and indications communicated via PDCP-SAP 1745 may comprise one or more radio bearers.

According to some aspects, an instance of SDAP 1747 may process requests from and provide indications to one or more higher layer protocol entities via one or more service data adaptation protocol service access points (SDAP-SAP) 1749. According to some aspects, requests and indications communicated via SDAP-SAP 1749 may comprise one or more quality of service (QoS) flows.

According to some aspects, RRC entity 1755 may configure, via one or more management service access points (M-SAP), aspects of one or more protocol layers, which may include one or more instances of PHY 1710, MAC 1720, RLC 1730, PDCP 1740 and SDAP 1747. According to some aspects, an instance of RRC 1755 may process requests from and provide indications to one or more NAS entities via one or more RRC service access points (RRC-SAP) 1756.

Figure 18:
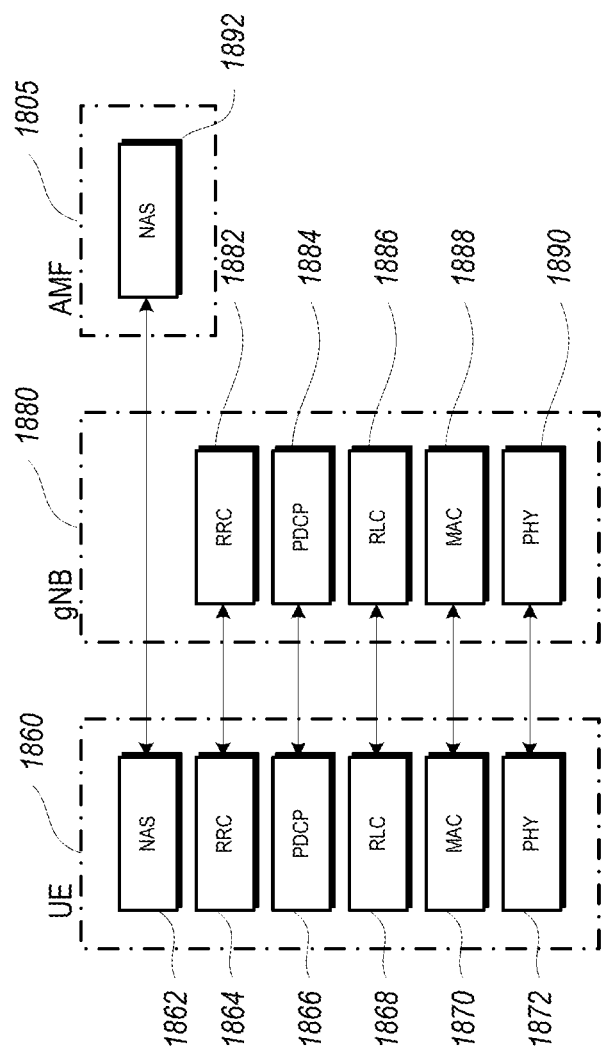
FIG. 18 is a simplified illustration of protocol entities that may be implemented in wireless communication devices, according to some embodiments.

FIG. 18 is a simplified illustration of protocol entities that may be implemented in wireless communication devices, according to some embodiments. The protocol entities include one or more of a user equipment (UE) 1860, a base station, which may be termed an evolved node B (eNB), or new radio node B (gNB) 1880, and a network function, which may be termed a mobility management entity (MME), or an access and mobility management function (AMF) 1805, according to some aspects.

According to some aspects, gNB 1880 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 1860, gNB 1880 and AMF 1894, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 1860, gNB 1880 and AMF 1894, may communicate with a respective peer protocol entity that may be implemented on another device, using the services of respective lower layer protocol entities to perform such communication.

According to some aspects, UE PHY 1872 and peer entity gNB PHY 1890 may communicate using signals transmitted and received via a wireless medium. According to some aspects, UE MAC 1870 and peer entity gNB MAC 1888 may communicate using the services provided respectively by UE PHY 1872 and gNB PHY 1890. According to some aspects, UE RLC 1868 and peer entity gNB RLC 1886 may communicate using the services provided respectively by UE MAC 1870 and gNB MAC 1888. According to some aspects, UE PDCP 1866 and peer entity gNB PDCP 1884 may communicate using the services provided respectively by UE RLC 1868 and gNB RLC 1886. According to some aspects, UE RRC 1864 and gNB RRC 1882 may communicate using the services provided respectively by UE PDCP 1866 and gNB PDCP 1884. According to some aspects, UE NAS 1862 and AMF NAS 1892 may communicate using the services provided respectively by UE RRC 1864 and gNB RRC 1882.

EXAMPLES

The following is a non-exhaustive list of example embodiments that fall within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, and the above disclosed embodiments, are not combinable, it is contemplated within the scope of the disclosure that such examples and embodiments are combinable.

Example 1

An apparatus of a cellular data communication device, comprising: one or more memory devices configured to store data corresponding to a plurality of service data units (SDUs) from a protocol layer higher than a packet data convergence protocol (PDCP) layer of a cellular data network; and one or more processors operably coupled to the one or more memory devices and configured to concatenate the plurality of SDUs into a single protocol data unit (PDU) above the PDCP layer.

Example 2

The apparatus of Example 1, wherein the one or more processors are configured to concatenate the plurality of SDUs into the single PDU in a service data adaptation protocol (SDAP) layer of the cellular data network.

Example 3

The apparatus according to any one of Examples 1 and 2, wherein at least a portion of the SDUs comprises internet protocol (IP) packets.

Example 4

The apparatus according to any one of Examples 1-3, wherein at least a portion of the SDUs comprises transmission control protocol (TCP) acknowledgements (ACKs).

Example 5

The apparatus according to any one of Examples 1-4, wherein the SDUs comprise SDUs from multiple quality of service (QoS) flows to be mapped to a single data radio bearer (DRB), and the one or more processors are configured to concatenate the SDUs from the multiple QoS flows into the single PDU.

Example 6

The apparatus according to any one of Examples 1-4, wherein the SDUs comprise SDUs from a single quality of service (QoS) flow to be mapped to a single data radio bearer (DRB), and the one or more processors are configured to concatenate the SDUs from the single QoS flow into the single PDU.

Example 7

The apparatus according to any one of Examples 1-6, wherein the cellular data communication device comprises one of a user equipment (UE) or a next generation NodeB (gNB).

Example 8

An apparatus of a cellular data communication device, comprising: one or more memory devices configured to store service data units (SDUs) from a protocol layer higher than a packet data convergence protocol (PDCP) layer of a cellular data network; and one or more processors operably coupled to the one or more memory device and configured to concatenate a plurality of the SDUs into a single protocol data unit (PDU) in a service data adaptation protocol (SDAP) layer of the cellular data network.

Example 9

The apparatus of Example 8, wherein: the plurality of the SDUs corresponds to a first data radio bearer (DRB); another plurality of the SDUs corresponds to a second DRB; and the one or more processors are configured to concatenate the another plurality of the SDUs into another single PDU in the SDAP.

Example 10

The apparatus according to any one of Examples 8 and 9, wherein the one or more processors are configured to concatenate the plurality of the SDUs into the single PDU after performing a header compression function on the SDUs.

Example 11

The apparatus according to any one of Examples 8-10, wherein at least a portion of the plurality of the SDUs includes voice over internet protocol (VoIP) packets.

Example 12

The apparatus according to any one of Examples 8-11, wherein the one or more processors are configured to include an SDAP layer protocol header in the single PDU.

Example 13

The apparatus of Example 12, wherein the SDAP layer protocol header does not include framing information, and the SDUs include framing information.

Example 14

The apparatus of Example 13, wherein the SDUs include internet protocol (IP) packets, and the framing information of the SDUs includes total length fields indicating entire packet size of the IP packets.

Example 15

The apparatus of Example 12, wherein the SDAP layer protocol header includes framing information.

Example 16

The apparatus of Example 15, wherein the framing information of the SDAP layer protocol header includes a set of an extension bit field (E) and a length indicator field (LI).

Example 17

An apparatus of a user equipment (UE), comprising: one or more memory devices configured to store a radio resource control (RRC) connection reconfiguration message received from a next generation NodeB (gNB), the RRC connection reconfiguration message indicating whether internet protocol (IP) concatenation is enabled or disabled at the gNB; and one or more processors operably coupled to the one or more memory devices and configured to: generate an RRC connection reconfiguration complete message to be transmitted to the gNB, the RRC connection reconfiguration complete message indicating whether the IP concatenation is enabled or disabled at the UE; and concatenate a plurality of IP packets into a single protocol data unit (PDU) if the IP concatenation is enabled at the gNB and the UE.

Example 18

The apparatus of Example 17, wherein: the RRC connection reconfiguration message received from the gNB also indicates, if the IP concatenation is enabled at the gNB, whether the IP concatenation should operate on a per-UE basis, a per-data radio bearer (DRB) basis, or a per-quality of service (QoS) flow basis; and the one or more processors are configured to concatenate the plurality of IP packets into the single PDU on the indicated one of the per-UE basis, the per-DRB basis, or the per-QoS flow basis.

Example 19

The apparatus according to any one of Examples 17 and 18, wherein the RRC connection reconfiguration message received from the gNB also indicates one or more of: a maximum concatenation delay parameter indicating a maximum latency for which the UE and gNB will hold an IP packet for concatenation; and a maximum concatenation size parameter indicating a maximum length of the single PDU.

Example 20

The apparatus according to any one of Examples 17-19, wherein the single PDU includes a combined IP packet comprising: a first IP packet of the combined IP packet, the first IP packet including a first IP header, the first IP header including: a protocol type of the first IP header changed from an original value of the protocol type to a value that indicates that the combined IP packet carries multiple IP packets; and a packet length is changed from an original packet length to a total combined length of the plurality of IP packets in the combined IP packet; and a trailer including: a trailer protocol type set to the original value of the protocol type of the first header of the first IP packet; and a trailer packet length set to the original packet length of the first IP packet.

Example 21

The apparatus according to any one of Examples 17-19, wherein the single PDU includes a combined IP packet comprising a combined IP header that is the same as a first IP header of a first IP packet of the plurality of IP packets in the combined IP packet except that: a protocol type of the combined IP header is changed from an original value of a first protocol type of the first IP header to a value that indicates that the combined IP packet carries multiple IP packets; and a packet length changed from an original packet length of the first IP packet to a total combined length of the plurality of IP packets in the combined IP packet.

Example 22

The apparatus according to any one of Examples 17-19, wherein the single PDU includes a combined IP packet comprising a packet data convergence protocol (PDCP) header, a service data adaptation protocol (SDAP) header, and an SDAP payload, the SDAP payload including the plurality of IP packets, at least one of the PDCP header or the SDAP header indicating that the SDAP payload includes multiple IP packets.

Example 23

An apparatus of a next generation NodeB (gNB), comprising: one or more memory devices configured to store service data units (SDUs) from a protocol layer higher than a packet data convergence protocol (PDCP) layer of a cellular data network; one or more processors operably coupled to the one or more memory devices, the one or more processors configured to: generate a radio resource control (RRC) connection reconfiguration message to be sent to a user equipment (UE), the RRC connection reconfiguration message indicating whether internet protocol (IP) concatenation is enabled or disabled at the gNB; decode an RRC connection reconfiguration message received from the UE, the RRC connection reconfiguration message indicating whether internet protocol (IP) concatenation is enabled or disabled at the UE; and concatenate a plurality of IP packets into a single protocol data unit (PDU) if the IP concatenation is enabled at the gNB and the UE.

Example 24

The apparatus of Example 23, wherein the RRC connection reconfiguration message also indicates, if the IP concatenation is enabled at the gNB, whether the IP concatenation should operate on a per-UE basis, a per-data radio bearer (DRB) basis, or a per-quality of service (QoS) flow basis.

Example 25

The apparatus according to any one of Examples 23 and 24, wherein the RRC connection reconfiguration message also indicates at least one of: a maximum concatenation delay parameter indicating a maximum latency for which the UE and the gNB will hold a packet for concatenation; or a maximum concatenation size parameter indicating a maximum length of a combined packet including the plurality of IP packets of the single PDU.

Example 26 may include a communication entity in wireless communication systems, the communication entity having circuitry to concatenate one or more protocol service data units (SDUs) to construct one or more protocol data units (PDUs) in a protocol layer above the Packet Data Convergence Protocol (PDCP) layer.

Example 27 may include the circuitry of example 26 and/or some other example herein, wherein the communication entity is user equipment (UE).

Example 28 may include the circuitry of example 26 and/or some other example herein, wherein the communication entity is a base station (gNB).

Example 29 may include the circuitry of example 26 and/or some other example herein, wherein no additional framing information is added in the protocol header.

Example 30 may include the circuitry of example 26 and/or some other example herein, wherein additional framing information is added in the protocol header.

Example 31 may include the circuitry of example 30 and/or some other example herein, wherein the said framing information includes a set of Extension bit (E) field and Length Indicator (LI) field.

Example 32 may include the circuitry of example 26 and/or some other example herein, wherein only one QoS-flow-id is present in the protocol PDU.

Example 33 may include the circuitry of example 26 and/or some other example herein, wherein multiple QoS-flow-ids are present in the protocol PDU.

Example 34 may include an apparatus comprising means to perform one or more elements of a method described in or related to any of examples 1-33, or any other method or process described herein.

Example 35 may include one or more non-transitory computer-readable media comprising instructions to cause an electronic device, upon execution of the instructions by one or more processors of the electronic device, to perform one or more elements of a method described in or related to any of examples 1-33, or any other method or process described herein.

Example 36 may include an apparatus comprising logic, modules, and/or circuitry to perform one or more elements of a method described in or related to any of examples 1-33, or any other method or process described herein.

Example 37 may include a method, technique, or process as described in or related to any of examples 1-33, or portions or parts thereof.

Example 38 may include an apparatus comprising: one or more processors and one or more computer readable media comprising instructions that, when executed by the one or more processors, cause the one or more processors to perform the method, techniques, or process as described in or related to any of examples 1-33, or portions thereof.

Example 39 may include a method of communicating in a wireless network as shown and described herein.

Example 40 may include a system for providing wireless communication as shown and described herein.

Example 41 may include a device for providing wireless communication as shown and described herein.

Example 42 may include a new radio resource control (RRC) field (internet protocol (IP) concatenation configuration) to support the proposed IP concatenation operation.

Example 43 may include a new data-plane function to support IP concatenation at both a user equipment (UE) and base station (gNB).

Example 44 may include three new protocol data unit (PDU) formats to support IP concatenation with zero impact on the rest of cellular stack, e.g., packet data convergence protocol (PDCP), radio link control (RLC), etc.

Example 45 may include a base station comprising: means for encoding and transmitting a radio resource control (RRC) connection reconfiguration message indicating whether internet protocol (IP) concatenation is enabled, and, if enabled, IP concatenation parameters and the mode of IP concatenation operation; and means for concatenating a plurality of IP packets into a concatenated IP packet according to the IP concatenation parameters and the mode of IP concatenation operation.

Example 46 may include the subject matter of example 45, wherein the IP concatenation parameters include a maximum concatenation delay, and a maximum concatenation size.

Example 47 may include the subject matter of example 46, wherein the maximum concatenation delay is the maximum latency a user equipment (UE) or the base station will hold an uplink or downlink IP packet, respectively, for concatenation.

Example 48 may include the subject matter of example 46 or 47, wherein the maximum concatenation size is the maximum length of a concatenated IP packet.

Example 49 may include the subject matter of any of examples 45-48, wherein the mode of IP concatenation operation is either per-user equipment (UE), per-data radio bearer (DRB), or per-QoS flow.

Example 50 may include the subject matter of example 49, where the IP concatenation parameters are used for all data radio bearers (DRBs) and Quality of Service (QoS) flows when the mode of IP concatenation operation is per-UE.

Example 51 may include the subject matter of example 49, where the IP concatenation parameters are only used for DRBs, and IP packets of different QoS flows may only be concatenated if they are mapped to a same DRB.

Example 52 may include the subject matter of example 49, where the IP concatenation parameters are only used for QoS flows, and only IP packets of the same QoS flow may be concatenated.

Example 53 may include the subject matter of any of examples 45-52, further comprising means for encoding the concatenated IP packet for transmission, wherein the concatenated IP packet is encoded using a protocol data unit (PDU), the PDU having a PDU format for IP concatenation comprised of a packet data convergence protocol (PDCP) header, an optional service data adaptation protocol (SDAP) header, and an SDAP payload.

Example 54 may include the subject matter of example 53, wherein the SDAP payload is comprised of the concatenated IP packet, the concatenated IP packet including a first IP packet and one or more second IP packets concatenated to the first IP packet, the first IP packet further comprised of an IP header and a payload, the IP header including: a protocol type set to a value that indicates that the SDAP payload carries multiple IP packets; and a packet length set to the total length of the concatenated IP packet.

Example 55 may include the subject matter of example 54, wherein the SDAP payload is further comprised of a trailer following the concatenated IP packet, the trailer including: a protocol type that is set to the same value as the protocol type included in the IP header of the first IP packet; and a packet length set to the length of the first IP packet.

Example 56 may include the subject matter of example 54, wherein the SDAP payload is further comprised of a header located before the first IP packet, the header being a duplicate of the IP header of the first IP packet.

Example 57 may include the subject matter of example 53 or 54, wherein either the PDCP or SDAP header includes a bit field to indicate if the SDAP payload includes the concatenated IP packet.

Example 58 may include a base station to: encode a radio resource control (RRC) connection reconfiguration message indicating whether internet protocol (IP) concatenation is enabled, and, if enabled, IP concatenation parameters and the mode of IP concatenation operation; transmit the RRC connection reconfiguration message; and concatenate a plurality of IP packets into a concatenated IP packet according to the IP concatenation parameters and the mode of IP concatenation operation when IP concatenation is enabled.

Example 59 may include the subject matter of example 58, wherein the IP concatenation parameters include a maximum concatenation delay, and a maximum concatenation size.

Example 60 may include the subject matter of example 59, wherein the maximum concatenation delay is the maximum latency a user equipment (UE) or the base station will hold an uplink or downlink IP packet, respectively, for concatenation.

Example 61 may include the subject matter of example 59 or 60, wherein the maximum concatenation size is the maximum length of a concatenated IP packet.

Example 62 may include the subject matter of any of examples 58-61, wherein the mode of IP concatenation operation is either per-user equipment (UE), per-data radio bearer (DRB), or per quality of service (QoS) flow.

Example 63 may include the subject matter of example 62, where the IP concatenation parameters are used for all data radio bearers (DRBs) and Quality of Service (QoS) flows when the mode of IP concatenation operation is per-UE.

Example 64 may include the subject matter of example 62, where the IP concatenation parameters are only used for DRBs, and IP packets of different QoS flows may only be concatenated if they are mapped to a same DRB.

Example 65 may include the subject matter of example 62, where the IP concatenation parameters are only used for QoS flows, and only IP packets of the same QoS flow may be concatenated.

Example 66 may include the subject matter of any of examples 58-65, wherein the base station is further to encode the concatenated IP packet for transmission using a protocol data unit (PDU), the PDU having a PDU format for IP concatenation comprised of a packet data convergence protocol (PDCP) header, an optional service data adaptation protocol (SDAP) header, and an SDAP payload.

Example 67 may include the subject matter of example 66, wherein the SDAP payload is comprised of the concatenated IP packet, the concatenated IP packet including a first IP packet and one or more second IP packets concatenated to the first IP packet, the first IP packet further comprised of an IP header and a payload, the IP header including: a protocol type set to a value that indicates that the SDAP payload carries multiple IP packets; and a packet length set to the total length of the concatenated IP packet.

Example 68 may include the subject matter of example 67, wherein the SDAP payload is further comprised of a trailer following the concatenated IP packet, the trailer including: a protocol type that is set to the same value as the protocol type included in the IP header of the first IP packet; and a packet length set to the length of the first IP packet.

Example 69 may include the subject matter of example 67, wherein the SDAP payload is further comprised of a header located before the first IP packet, the header being a duplicate of the IP header.

Example 70 may include the subject matter of example 66 or 67, wherein either the PDCP or SDAP header includes a bit field to indicate if the SDAP payload includes the concatenated IP packet.

Example 71 may include a method comprising: encoding or causing to encode a radio resource control (RRC) connection reconfiguration message indicating whether internet protocol (IP) concatenation is enabled, and, if enabled, IP concatenation parameters and the mode of IP concatenation operation; transmitting or causing to transmit the RRC connection reconfiguration message; and when IP concatenation is enabled, concatenating or causing to concatenate a plurality of IP packets into a concatenated IP packet according to the IP concatenation parameters and the mode of IP concatenation operation; and transmitting or causing to transmit the concatenated IP packet.

Example 72 may include the subject matter of example 71, wherein the IP concatenation parameters include a maximum concatenation delay, and a maximum concatenation size.

Example 73 may include the subject matter of example 72, wherein the maximum concatenation delay is the maximum latency a user equipment (UE) or a base station will hold an uplink or downlink IP packet, respectively, for concatenation.

Example 74 may include the subject matter of example 72 or 73, wherein the maximum concatenation size is the maximum length of a concatenated IP packet.

Example 75 may include the subject matter of any of examples 71-74, wherein the mode of IP concatenation operation is either per-user equipment (UE), per-data radio bearer (DRB), or per quality of service (QoS) flow.

Example 76 may include the subject matter of example 75, where the IP concatenation parameters are used for all data radio bearers (DRBs) and Quality of Service (QoS) flows when the mode of IP concatenation operation is per-UE.

Example 77 may include the subject matter of example 75, where the IP concatenation parameters are only used for DRBs, and IP packets of different QoS flows may only be concatenated if they are mapped to a same DRB.

Example 78 may include the subject matter of example 75, where the IP concatenation parameters are only used for QoS flows, and only IP packets of the same QoS flow may be concatenated.

Example 79 may include the subject matter of any of examples 71-78, further comprising encoding, or causing to encode, the concatenated IP packets for transmitting using a protocol data unit (PDU), the PDU having a PDU format for IP concatenation comprised of a packet data convergence protocol (PDCP) header, an optional service data adaptation protocol (SDAP) header, and an SDAP payload.

Example 80 may include the subject matter of example 79, wherein the SDAP payload is comprised of the concatenated IP packet, the concatenated IP packet including a first IP packet and one or more second IP packets concatenated to the first IP packet, the first IP packet further comprised of an IP header and a payload, the IP header including: a protocol type set to a value that indicates that the SDAP payload carries multiple IP packets; and a packet length set to the total length of the concatenated IP packet.

Example 81 may include the subject matter of example 80, wherein the SDAP payload is further comprised of a trailer following the concatenated IP packet, the trailer including: a protocol type that is set to the same value as the protocol type included in the IP header of the first IP packet; and a packet length set to the length of the first IP packet.

Example 82 may include the subject matter of example 80, wherein the SDAP payload is further comprised of a header located before the first IP packet, the header being a duplicate of the IP header.

Example 83 may include the subject matter of example 81 or 82, wherein either the PDCP or SDAP header includes a bit field to indicate if the SDAP payload includes the concatenated IP packet.

Example 84 may include the method of any of examples 71 to 83, wherein the method is performed by a base station or a portion thereof.

Example 85 may include a user equipment (UE) comprising: means for decoding a received radio resource control (RRC) connection reconfiguration message indicating whether internet protocol (IP) concatenation is enabled and, if enabled, IP concatenation parameters and the mode of IP concatenation operation; means for encoding for transmission an RRC connection reconfiguration message indicating whether the UE has enabled IP concatenation in response to the received RRC connection reconfiguration message; and means for concatenating a plurality of IP packets into a concatenated IP packet according to the IP concatenation parameters and the mode of IP concatenation operation.

Example 86 may include the subject matter of example 85, wherein the IP concatenation parameters include a maximum concatenation delay, and a maximum concatenation size.

Example 87 may include the subject matter of example 86, wherein the maximum concatenation delay is the maximum latency the user equipment (UE) or a base station will hold an uplink or downlink IP packet, respectively, for concatenation.

Example 88 may include the subject matter of example 86 or 87, wherein the maximum concatenation size is the maximum length of a concatenated IP packet.

Example 89 may include the subject matter of any of examples 85-88, wherein the mode of IP concatenation operation is either per-UE, per-DRB, or per-QoS flow.

Example 90 may include the subject matter of example 89, where the IP concatenation parameters are used for all data radio bearers (DRBs) and Quality of Service (QoS) flows when the mode of IP concatenation operation is per-UE.

Example 91 may include the subject matter of example 89, where the IP concatenation parameters are only used for DRBs, and IP packets of different QoS flows may only be concatenated if they are mapped to a same DRB.

Example 92 may include the subject matter of example 89, where the IP concatenation parameters are only used for QoS flows, and only IP packets of the same QoS flow may be concatenated.

Example 93 may include the subject matter of any of examples 85-92, further comprising means for encoding the concatenated IP packet for transmission, wherein the concatenated IP packet is encoded using a protocol data unit (PDU), the PDU having a PDU format for IP concatenation comprised of a packet data convergence protocol (PDCP) header, a service data adaptation protocol (SDAP) header, and an SDAP payload.

Example 94 may include the subject matter of example 93, wherein the SDAP payload is comprised of the concatenated IP packet, the concatenated IP packet including a first IP packet and one or more second IP packets concatenated to the first IP packet, the first IP packet further comprised of an IP header and a payload, the IP header including: a protocol type set to a value that indicates that the SDAP payload carries multiple IP packets; and a packet length set to the total length of the concatenated IP packet.

Example 95 may include the subject matter of example 94, wherein the SDAP payload is further comprised of a trailer following the concatenated IP packet, the trailer including: a protocol type that is set to the same value as the protocol type included in the IP header; and a packet length set to the length of the first IP packet.

Example 96 may include the subject matter of example 94, wherein the SDAP payload is further comprised of a header located before the first IP packet, the header being a duplicate of the IP header.

Example 97 may include the subject matter of example 93 or 94, wherein either the PDCP or SDAP header includes a bit field to indicate if the SDAP payload includes the concatenated IP packet.

Example 98 may include a user equipment (UE) to: decode a received radio resource control (RRC) connection reconfiguration message indicating whether internet protocol (IP) concatenation is enabled and, if enabled, IP concatenation parameters and the mode of IP concatenation operation; encode an RRC connection reconfiguration message indicating whether the UE has enabled IP concatenation in response to the received RRC connection reconfiguration message; transmit the RRC connection reconfiguration message; and concatenate a plurality of IP packets into a concatenated IP packet according to the IP concatenation parameters and the mode of IP concatenation operation, when IP concatenation is enabled.

Example 99 may include the subject matter of example 98, wherein the IP concatenation parameters include a maximum concatenation delay, and a maximum concatenation size.

Example 100 may include the subject matter of example 99, wherein the maximum concatenation delay is the maximum latency the user equipment (UE) or a base station will hold an uplink or downlink IP packet, respectively, for concatenation.

Example 101 may include the subject matter of example 99 or 100, wherein the maximum concatenation size is the maximum length of a concatenated IP packet.

Example 102 may include the subject matter of any of examples 98-101, wherein the mode of IP concatenation operation is either per-UE, per-DRB, or per-QoS flow.

Example 103 may include the subject matter of example 102, where the IP concatenation parameters are used for all data radio bearers (DRBs) and Quality of Service (QoS) flows when the mode of IP concatenation operation is per-UE.

Example 104 may include the subject matter of example 102, where the IP concatenation parameters are only used for DRBs, and IP packets of different QoS flows may only be concatenated if they are mapped to a same DRB.

Example 105 may include the subject matter of example 102, where the IP concatenation parameters are only used for QoS flows, and only IP packets of the same QoS flow may be concatenated.

Example 106 may include the subject matter of any of examples 98-105, wherein the UE is further to encode the concatenated IP packet for transmission using a protocol data unit (PDU), the PDU having a PDU format for IP concatenation comprised of a packet data convergence protocol (PDCP) header, a service data adaptation protocol (SDAP) header, and an SDAP payload.

Example 107 may include the subject matter of example 106, wherein the SDAP payload is comprised of the concatenated IP packet, the concatenated IP packet including a first IP packet and one or more second IP packets concatenated to the first IP packet, the first IP packet further comprised of an IP header and a payload, the IP header including: a protocol type set to a value that indicates that the SDAP payload carries multiple IP packets; and a packet length set to the total length of the concatenated IP packet.

Example 108 may include the subject matter of example 107, wherein the SDAP payload is further comprised of a trailer following the concatenated IP packet, the trailer including: a protocol type that is set to the same value as the protocol type included in the IP header; and a packet length set to the length of the first IP packet.

Example 109 may include the subject matter of example 107, wherein the SDAP payload is further comprised of a header located before the first IP packet, the header being a duplicate of the IP header.

Example 110 may include the subject matter of example 106 or 107, wherein either the PDCP or SDAP header includes a bit field to indicate if the SDAP payload includes the concatenated IP packet.

Example 111 may include a method comprising: decoding or causing to decode a received radio resource control (RRC) connection reconfiguration message indicating whether internet protocol (IP) concatenation is enabled and, if enabled, IP concatenation parameters and the mode of IP concatenation operation; encoding or causing to encode an RRC connection reconfiguration message indicating whether the UE has enabled IP concatenation in response to the received RRC connection reconfiguration message; transmitting or causing to transmit the RRC connection reconfiguration message; and when IP concatenation is enabled, concatenating or causing to concatenate a plurality of IP packets into a concatenated IP packet according to the IP concatenation parameters and the mode of IP concatenation operation; and transmitting or causing to transmit the concatenated IP packet.

Example 112 may include the subject matter of example 111, wherein the IP concatenation parameters include a maximum concatenation delay, and a maximum concatenation size.

Example 113 may include the subject matter of example 112, wherein the maximum concatenation delay is the maximum latency a user equipment (UE) or a base station will hold an uplink or downlink IP packet, respectively, for concatenation.

Example 114 may include the subject matter of example 112 or 113, wherein the maximum concatenation size is the maximum length of a concatenated IP packet.

Example 115 may include the subject matter of any of examples 111-114, wherein the mode of IP concatenation operation is either per-UE, per-DRB, or per-QoS flow.

Example 116 may include the subject matter of example 115, where the IP concatenation parameters are used for all data radio bearers (DRBs) and Quality of Service (QoS) flows when the mode of IP concatenation operation is per-UE.

Example 117 may include the subject matter of example 115, where the IP concatenation parameters are only used for DRBs, and IP packets of different QoS flows may only be concatenated if they are mapped to a same DRB.

Example 118 may include the subject matter of example 115, where the IP concatenation parameters are only used for QoS flows, and only IP packets of the same QoS flow may be concatenated.

Example 119 may include the subject matter of any of examples 111-118, further comprising encoding, or causing to encode, the concatenated IP packets for transmitting using a protocol data unit (PDU), the PDU having a PDU format for IP concatenation comprised of a packet data convergence protocol (PDCP) header, a service data adaptation protocol (SDAP) header, and an SDAP payload.

Example 120 may include the subject matter of example 119, wherein the SDAP payload is comprised of the concatenated IP packet, the concatenated IP packet including a first IP packet and one or more second IP packets concatenated to the first IP packet, the first IP packet further comprised of an IP header and a payload, the IP header including: a protocol type set to a value that indicates that the SDAP payload carries multiple IP packets; and a packet length set to the total length of the concatenated IP packet.

Example 121 may include the subject matter of example 120, wherein the SDAP payload is further comprised of a trailer following the concatenated IP packet, the trailer including: a protocol type that is set to the same value as the protocol type included in the IP header; and a packet length set to the length of the first IP packet.

Example 122 may include the subject matter of example 120, wherein the SDAP payload is further comprised of a header located before the first IP packet, the header being a duplicate of the IP header.

Example 123 may include the subject matter of example 119 or 120, wherein either the PDCP or SDAP header includes a bit field to indicate if the SDAP payload includes the concatenated IP packet.

Example 124 may include the method of any of examples 111 to 123, wherein the method is performed by a UE or a portion thereof.

Example 125 may include an apparatus comprising means to perform one or more elements of a method described in or related to any of examples 1-124, or any other method or process described herein.

Example 126 may include one or more non-transitory computer-readable media comprising instructions to cause an electronic device, upon execution of the instructions by one or more processors of the electronic device, to perform one or more elements of a method described in or related to any of examples 1-124, or any other method or process described herein.

Example 127 may include an apparatus comprising logic, modules, or circuitry to perform one or more elements of a method described in or related to any of examples 1-124, or any other method or process described herein.

Example 128 may include a method, technique, or process as described in or related to any of examples 1-124, or portions or parts thereof.

Example 129 may include an apparatus comprising: one or more processors and one or more computer readable media comprising instructions that, when executed by the one or more processors, cause the one or more processors to perform the method, techniques, or process as described in or related to any of examples 1-124, or portions thereof.

Example 130 may include a signal as described in or related to any of examples 1-124, or portions or parts thereof.

Example 131 may include a signal in a wireless network as shown and described herein.

Example 132 may include a method of communicating in a wireless network as shown and described herein.

Example 133 may include a system for providing wireless communication as shown and described herein.

Example 134 may include a device for providing wireless communication as shown and described herein.

CONCLUSION

It will be apparent to those having skill in the art that many changes may be made to the details of the above-described embodiments without departing from the underlying principles of the disclosure. The scope of the present disclosure should, therefore, be determined only by the following claims.

The invention claimed is:

1. An apparatus of a cellular data communication device, comprising:
one or more memory devices configured to store data corresponding to a plurality of service data units (SDUs) from a protocol layer higher than a packet data convergence protocol (PDCP) layer of a cellular data network; and
one or more processors operably coupled to the one or more memory devices and configured to concatenate the plurality of SDUs into a single protocol data unit (PDU) above the PDCP layer in a service data adaptation protocol (SDAP) layer of the cellular data network, wherein the plurality of SDUs concatenated into the single PDU in the SDAP layer belong to a same data radio bearer (DRB).

2. The apparatus of claim 1, wherein at least a portion of the SDUs comprises internet protocol (IP) packets.

3. The apparatus of claim 1, wherein at least a portion of the SDUs comprises transmission control protocol (TCP) acknowledgements (ACKs).

4. The apparatus of claim 1, wherein the cellular data communication device comprises one of a user equipment (UE) or a base station.

5. An apparatus of a cellular data communication device, comprising:
one or more memory devices configured to store service data units (SDUs) from a protocol layer higher than a packet data convergence protocol (PDCP) layer of a cellular data network; and
one or more processors operably coupled to the one or more memory device and configured to concatenate a plurality of the SDUs into a single protocol data unit (PDU) in a service data adaptation protocol (SDAP) layer of the cellular data network,
wherein when the plurality of SDUs comprise framing information, an SDAP header of the single PDU concatenated at the SDAP layer does not include the framing information, and
wherein when the plurality of SDUs do not comprise framing information, the SDAP header of the single PDU concatenated at the SDAP layer includes the framing information.

6. The apparatus of claim 5, wherein:
the plurality of the SDUs corresponds to a first data radio bearer (DRB);
another plurality of the SDUs corresponds to a second DRB; and
the one or more processors are configured to concatenate the another plurality of the SDUs into another single PDU in the SDAP.

7. The apparatus of claim 5, wherein the one or more processors are configured to concatenate the plurality of the SDUs into the single PDU after performing a header compression function on the SDUs.

8. The apparatus of claim 5, wherein at least a portion of the plurality of the SDUs includes voice over internet protocol (VoIP) packets.

9. An apparatus of a user equipment (UE), comprising:
one or more memory devices configured to store a radio resource control (RRC) connection reconfiguration message received from a base station, the RRC connection reconfiguration message indicating whether internet protocol (IP) concatenation is enabled or disabled at the base station; and one or more processors operably coupled to the one or more memory devices and configured to:

generate an RRC connection reconfiguration complete message to be transmitted to the base station, the RRC connection reconfiguration complete message indicating whether the IP concatenation is enabled or disabled at the UE; and concatenate a plurality of IP packets into a single protocol data unit (PDU) above a packet data convergence protocol (PDCP) layer in a service data adaptation protocol (SDAP) layer if the IP concatenation is enabled at the base station and the UE.

10. The apparatus of claim 9, wherein:

the RRC connection reconfiguration message received from the base station also indicates, if the IP concatenation is enabled at the base station, whether the IP concatenation should operate on a per-UE basis, a per-data radio bearer (DRB) basis, or a per-quality of service (QoS) flow basis; and the one or more processors are configured to concatenate the plurality of IP packets into the single PDU on the indicated one of the per-UE basis, the per-DRB basis, or the per-QoS flow basis.

11. The apparatus of claim 9, wherein the RRC connection reconfiguration message received from the base station also indicates one or more of:

a maximum concatenation delay parameter indicating a maximum latency for which the UE and base station will hold an IP packet for concatenation; and a maximum concatenation size parameter indicating a maximum length of the single PDU.

12. The apparatus of claim 9, wherein the single PDU includes a combined IP packet comprising:

a first IP packet of the combined IP packet, the first IP packet including a first IP header, the first IP header including:

a protocol type of the first IP header changed from an original value of the protocol type to a value that indicates that the combined IP packet carries multiple IP packets; and a packet length is changed from an original packet length to a total combined length of the plurality of IP packets in the combined IP packet; and a trailer including:

a trailer protocol type set to the original value of the protocol type of the first IP header of the first IP packet; and a trailer packet length set to the original packet length of the first IP packet.

13. The apparatus of claim 9, wherein the single PDU includes a combined IP packet comprising a combined IP header that is the same as a first IP header of a first IP packet of the plurality of IP packets in the combined IP packet except that:

a protocol type of the combined IP header is changed from an original value of a first protocol type of the first IP header to a value that indicates that the combined IP packet carries multiple IP packets; and a packet length changed from an original packet length of the first IP packet to a total combined length of the plurality of IP packets in the combined IP packet.

14. The apparatus of claim 9, wherein the single PDU includes a combined IP packet comprising a packet data convergence protocol (PDCP) header, an SDAP header, and an SDAP payload, the SDAP payload including the plurality of IP packets, at least one of the PDCP header or the SDAP header indicating that the SDAP payload includes multiple IP packets.

15. An apparatus of a base station, comprising:

one or more memory devices configured to store service data units (SDUs) from a protocol layer higher than a packet data convergence protocol (PDCP) layer of a cellular data network;

one or more processors operably coupled to the one or more memory devices, the one or more processors configured to:

generate a radio resource control (RRC) connection reconfiguration message to be sent to a user equipment (UE), the RRC connection reconfiguration message indicating whether internet protocol (IP) concatenation is enabled or disabled at the base station;

decode an RRC connection reconfiguration message received from the UE, the RRC connection reconfiguration message indicating whether internet protocol (IP) concatenation is enabled or disabled at the UE; and concatenate a plurality of IP packets into a single protocol data unit (PDU) above the PDCP layer in a service data adaptation protocol (SDAP) layer if the IP concatenation is enabled at the base station and the UE.

16. The apparatus of claim 15, wherein the RRC connection reconfiguration message also indicates, if the IP concatenation is enabled at the base station, whether the IP concatenation should operate on a per-UE basis, a per-data radio bearer (DRB) basis, or a per-quality of service (QoS) flow basis.

17. The apparatus of claim 16, wherein the RRC connection reconfiguration message also indicates at least one of:

a maximum concatenation delay parameter indicating a maximum latency for which the UE and the base station will hold a packet for concatenation; or a maximum concatenation size parameter indicating a maximum length of a combined packet including the plurality of IP packets of the single PDU.

* * * * *